US012407107B2

(12) United States Patent
Rodríguez et al.

(10) Patent No.: US 12,407,107 B2
(45) Date of Patent: Sep. 2, 2025

(54) ANTENNA SYSTEMS WITH TUNABLE FREQUENCY RESPONSE CIRCUITS

(71) Applicant: Skyworks Solutions, Inc., Irvine, CA (US)

(72) Inventors: René Rodríguez, Rancho Santa Margarita, CA (US); Stephen Joseph Kovacic, Newport Beach, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 157 days.

(21) Appl. No.: 18/333,329

(22) Filed: Jun. 12, 2023

(65) Prior Publication Data

US 2024/0006770 A1 Jan. 4, 2024

Related U.S. Application Data

(60) Provisional application No. 63/367,523, filed on Jul. 1, 2022.

(51) Int. Cl.
*H01Q 9/04* (2006.01)

(52) U.S. Cl.
CPC ................................ *H01Q 9/0442* (2013.01)

(58) Field of Classification Search
CPC .... H01Q 9/0442; H01Q 1/2283; H01Q 19/28; H01Q 5/335
See application file for complete search history.

(56) References Cited

U.S. PATENT DOCUMENTS

| | | | |
|---|---|---|---|
| 5,231,410 | A | 7/1993 | Murakami et al. |
| 5,673,053 | A | 9/1997 | Marthinsson |
| 5,966,097 | A | 10/1999 | Fukasawa et al. |
| 6,061,025 | A | 5/2000 | Jackson et al. |
| 6,501,427 | B1 | 12/2002 | Lilly et al. |
| 6,828,938 | B2 | 12/2004 | Tran |

(Continued)

FOREIGN PATENT DOCUMENTS

| | | |
|---|---|---|
| JP | S62-064014 | 4/1987 |
| JP | 2005-322972 | 11/2005 |

(Continued)

OTHER PUBLICATIONS

Suzuki et al., "An Integrated Configuration of Antennas and Filters for Front-End Module in Massive-MIMO Transmitter" IEEE International Symposium on Radio-Frequency Integration Technology 2015, 3 pages.

(Continued)

*Primary Examiner* — Awat M Salih

(74) *Attorney, Agent, or Firm* — Knobbe, Martens, Olson & Bear, LLP

(57) ABSTRACT

Antenna systems with tunable frequency response circuits are provided herein. In certain embodiments, an antenna system includes an antenna element and a tuning conductor that is spaced apart from the antenna element and operable to load the antenna element. Thus, the tuning conductor is electromagnetically coupled to the antenna element, for instance, capacitively coupled to the antenna element. Furthermore, a tunable frequency response circuit is electrically connected to the tuning conductor. By implementing the antenna system in this manner, antenna characteristics of the antenna element can be controlled.

20 Claims, 23 Drawing Sheets

(56) References Cited

U.S. PATENT DOCUMENTS

| | | | | |
|---|---|---|---|---|
| 6,844,852 | B1 | 1/2005 | Simons | |
| 7,068,234 | B2 | 6/2006 | Sievenpiper | |
| 7,260,424 | B2 | 8/2007 | Schmidt | |
| 7,265,724 | B1 | 9/2007 | Tan et al. | |
| 7,372,406 | B2 | 5/2008 | Shiotsu et al. | |
| 7,477,201 | B1 | 1/2009 | Bit-Babik et al. | |
| 7,834,813 | B2 * | 11/2010 | Caimi | H01Q 9/045 343/745 |
| 7,868,829 | B1 | 1/2011 | Colburn et al. | |
| 7,952,533 | B2 | 5/2011 | Hur et al. | |
| 8,369,796 | B2 | 2/2013 | Pan et al. | |
| 8,380,132 | B2 | 2/2013 | Nagy | |
| 8,654,034 | B2 | 2/2014 | Legare | |
| 8,659,480 | B2 | 2/2014 | Wilkins | |
| 8,967,485 | B2 | 3/2015 | Piazza et al. | |
| 9,002,431 | B2 | 4/2015 | Jones | |
| 9,077,082 | B2 | 7/2015 | Tatarnikov et al. | |
| 9,203,144 | B2 | 12/2015 | De Luis et al. | |
| 9,236,955 | B2 | 1/2016 | Bahl et al. | |
| 9,379,449 | B2 | 6/2016 | Cetiner et al. | |
| 9,537,201 | B2 | 1/2017 | Alexopoulos et al. | |
| 9,711,849 | B1 | 7/2017 | Chen et al. | |
| 9,793,597 | B2 | 10/2017 | Shamblin et al. | |
| 9,859,617 | B1 | 1/2018 | Desclos et al. | |
| 9,941,584 | B2 | 4/2018 | Kona et al. | |
| 9,941,593 | B2 | 4/2018 | Ozdemir | |
| 10,038,240 | B2 | 7/2018 | Patron et al. | |
| 10,439,288 | B2 | 10/2019 | Rodríguez | |
| 10,892,555 | B2 | 1/2021 | Rodríguez | |
| 10,965,035 | B2 | 3/2021 | Rodríguez et al. | |
| 11,158,938 | B2 | 10/2021 | Rodriguez et al. | |
| 11,424,541 | B2 | 8/2022 | Rodriguez | |
| 11,735,815 | B2 | 8/2023 | Rodriguez et al. | |
| 11,973,283 | B2 | 4/2024 | Rodriguez et al. | |
| 2001/0050651 | A1 * | 12/2001 | Grangeat | H01Q 13/106 343/769 |
| 2003/0098812 | A1 | 5/2003 | Ying et al. | |
| 2005/0088358 | A1 | 4/2005 | Larry et al. | |
| 2005/0248418 | A1 | 11/2005 | Govind et al. | |
| 2006/0152411 | A1 | 7/2006 | Iguchi et al. | |
| 2006/0281423 | A1 | 12/2006 | Caimi et al. | |
| 2007/0069958 | A1 | 3/2007 | Ozkar | |
| 2008/0088510 | A1 | 4/2008 | Murata et al. | |
| 2009/0224991 | A1 | 9/2009 | Rowson et al. | |
| 2009/0236701 | A1 | 9/2009 | Sun et al. | |
| 2009/0322619 | A1 | 12/2009 | Ollikainen et al. | |
| 2010/0304693 | A1 | 12/2010 | Uejima et al. | |
| 2011/0133994 | A1 | 6/2011 | Korva | |
| 2013/0099987 | A1 | 4/2013 | Desclos et al. | |
| 2013/0147672 | A1 | 6/2013 | Desclos et al. | |
| 2014/0266938 | A1 | 9/2014 | Ouyang et al. | |
| 2014/0306859 | A1 * | 10/2014 | Desclos | H01Q 5/385 343/822 |
| 2014/0333496 | A1 | 11/2014 | Hu et al. | |
| 2015/0022408 | A1 | 1/2015 | Shamblin et al. | |
| 2016/0134349 | A1 | 5/2016 | Ljung et al. | |
| 2016/0218431 | A1 | 7/2016 | Gaddi et al. | |
| 2016/0302319 | A1 | 10/2016 | Ferretti et al. | |
| 2016/0352006 | A1 | 12/2016 | Shtrom et al. | |
| 2017/0324148 | A1 | 11/2017 | Stevenson et al. | |
| 2018/0090847 | A1 | 3/2018 | Romano et al. | |
| 2018/0219276 | A1 | 8/2018 | Han et al. | |
| 2018/0263561 | A1 | 9/2018 | Jones | |
| 2018/0294569 | A1 | 10/2018 | Hoang et al. | |
| 2019/0007120 | A1 | 1/2019 | Hu et al. | |
| 2020/0099134 | A1 * | 3/2020 | Rodríguez | H01Q 1/50 |
| 2021/0184358 | A1 | 6/2021 | Rodriguez et al. | |
| 2022/0013894 | A1 | 1/2022 | Rodriguez et al. | |
| 2023/0344117 | A1 | 10/2023 | Rodriguez et al. | |
| 2024/0243478 | A1 | 7/2024 | Rodriguez et al. | |

FOREIGN PATENT DOCUMENTS

| | | |
|---|---|---|
| JP | 2007-037109 | 2/2007 |
| JP | 2008-278218 | 11/2008 |
| KR | 10-2009-0057350 A | 6/2009 |
| WO | WO 2008/103102 | 8/2008 |
| WO | WO 2014/046710 | 3/2014 |
| WO | WO 2016/059960 | 4/2016 |

OTHER PUBLICATIONS

Zetterberg et al., Project Name: Millimetre-Wave Based Mobile Radio Access Network for Fifth Generation Integrated Communications (mmMAGIC), "Initial multi-node and antenna transmitter and receiver architectures and schemes," dated Mar. 31, 2016, 140 pages.

International Search Report and Written Opinion of the International Searching Authority for International Application No. PCT/US2017/065172 dated Mar. 29, 2018, in 12 pages.

Written Opinion from Singapore Patent Office for Application No. 11201905304S, dated Jun. 30, 2020, in 7 pages.

* cited by examiner

ANTENNA SYSTEMS WITH TUNABLE FREQUENCY RESPONSE CIRCUITS

CROSS-REFERENCE TO RELATED APPLICATIONS

This application claims the benefit of priority under 35 U.S.C. § 119 of U.S. Provisional Patent Application No. 63/367,523, filed Jul. 1, 2022 and titled "ANTENNA SYSTEMS WITH TUNABLE FREQUENCY RESPONSE CIRCUITS," which is herein incorporated by reference in its entirety.

BACKGROUND

Field

Embodiments of the invention relate to electronic systems, and in particular, to radio frequency (RF) electronics.

Description of Related Technology

A radio frequency (RF) communication system can include a transceiver, a front end, and one or more antennas for wirelessly transmitting and receiving signals. The front end can include low noise amplifier(s) for amplifying signals received via the antenna(s), and power amplifier(s) for boosting signals for transmission via the antenna(s).

Examples of RF communication systems include, but are not limited to, mobile phones, tablets, base stations (including macro cell base stations and small cell base stations), network access points, customer-premises equipment (CPE), laptops, and wearable electronics.

SUMMARY

In certain embodiments, the present disclosure relates to an antenna system. The antenna system includes a first antenna element, a first tuning conductor electromagnetically coupled to the first antenna element and operable to load the first antenna element, and a first tunable frequency response circuit electrically connected to the first tuning conductor, the first tunable frequency response circuit having an impedance that is controllable to tune the first antenna element.

In some embodiments, the first tunable frequency response circuit is electrically connected between the first tuning conductor and ground.

In several embodiments, the first tunable frequency response circuit is controllable by data received over a bus.

In various embodiments, the first tunable frequency response circuit includes a plurality of circuit branches electrically connected in parallel and each including a selection switch for activating the circuit branch. According to a number of embodiments, each of the plurality of circuit branches includes a capacitor in series with the selection switch. In accordance with several embodiments, each of the plurality of circuit branches includes an inductor in series with the selection switch. According to some embodiments, each of the plurality of circuit branches includes an inductor and a capacitor in series with the selection switch.

In several embodiments, the impedance of the first tunable frequency response circuit is operable to compensate for a mismatch of the first antenna element.

In some embodiments, the impedance of the first tunable frequency response circuit is operable to tune an antenna gain of the first antenna element.

In various embodiments, the impedance of the first tunable frequency response circuit is operable to tune a center frequency of the first antenna element.

In a number of embodiments, the impedance of the first tunable frequency response circuit is operable to tune a bandwidth of the first antenna element.

In several embodiments, the impedance of the first tunable frequency response circuit is operable to tune a location in frequency of a secondary resonance of the first antenna element.

In some embodiments, the antenna system further includes a second tuning conductor electromagnetically coupled to the first antenna element, and a second tunable frequency response circuit electrically connected to the second tuning conductor. According to several embodiments, the first tuning conductor and the second tuning conductor are positioned along different sides of the first antenna element.

In various embodiments, the antenna system further includes a second antenna element, the first tuning conductor electromagnetically coupled to the second antenna element and operable to load the second antenna element.

In several embodiments, the antenna system further includes a second antenna element, a second tuning conductor electromagnetically coupled to the second antenna element and operable to load the second antenna element, and a second tunable frequency response circuit electrically connected to the second tuning conductor.

In various embodiments, the first antenna element includes a signal feed configured to handle a radio frequency signal and a ground feed, the antenna system further comprising a second tunable frequency response circuit electrically connected to the ground feed.

In a number of embodiments, the first antenna element is a patch antenna, a dipole antenna, a ceramic resonator, a stamped metal antenna, or a laser direct structuring antenna.

In some embodiments, the first tunable frequency response circuit is integrated on a module substrate. According to several embodiments, the first antenna element and the first tuning conductor are integrated on the module substrate. In accordance with various embodiments, the first antenna element and the first tuning conductor are integrated on a glass substrate that is coupled to the module substrate.

In certain embodiments, the present disclosure relates to a mobile device. The mobile device includes a first antenna element including a signal feed configured to receive an amplified radio frequency signal, a first tuning conductor electromagnetically coupled to the first antenna element and operable to load the first antenna element, and a front end system. The front end system includes a power amplifier configured to amplify a radio frequency signal to generate the amplified radio frequency signal and a first tunable frequency response circuit electrically connected to the first tuning conductor, the first tunable frequency response circuit having an impedance that is controllable to tune the first antenna element.

In some embodiments, the first tunable frequency response circuit is electrically connected between the first tuning conductor and ground.

In various embodiments, the first tunable frequency response circuit is controllable by data received over a bus.

In several embodiments, the first tunable frequency response circuit includes a plurality of circuit branches electrically connected in parallel and each including a selection switch for activating the circuit branch. According to a number of embodiments, each of the plurality of circuit branches includes a capacitor in series with the selection switch. In accordance with various embodiments, each of the plurality of circuit branches includes an inductor in series with the selection switch. In accordance with some embodiments, each of the plurality of circuit branches includes an inductor and a capacitor in series with the selection switch.

In various embodiments, the impedance of the first tunable frequency response circuit is operable to compensate for a mismatch of the first antenna element.

In several embodiments, the impedance of the first tunable frequency response circuit is operable to tune an antenna gain of the first antenna element.

In some embodiments, the impedance of the first tunable frequency response circuit is operable to tune a center frequency of the first antenna element.

In various embodiments, the impedance of the first tunable frequency response circuit is operable to tune a bandwidth of the first antenna element.

In several embodiments, the impedance of the first tunable frequency response circuit is operable to tune a location in frequency of a secondary resonance of the first antenna element.

In some embodiments, mobile device further includes a second tuning conductor electromagnetically coupled to the first antenna element and operable to load the first antenna element, and a second tunable frequency response circuit electrically connected to the second tuning conductor. According to a number of embodiments, the first tuning conductor and the second tuning conductor are positioned along different sides of the first antenna element.

In several embodiments, the mobile device further includes a second antenna element, the first tuning conductor electromagnetically coupled to the second antenna element and operable to load the second antenna element.

In various embodiments, the mobile device further includes a second antenna element and a second tuning conductor electromagnetically coupled to the second antenna element and operable to load the second antenna element, and the front end system further includes a second tunable frequency response circuit electrically connected to the second tuning conductor.

In several embodiments, the first antenna element includes a signal feed configured to receive the amplified radio frequency signal and a ground feed, and the front end system further includes a second tunable frequency response circuit electrically connected to the ground feed.

In various embodiments, the first antenna element is a patch antenna, a dipole antenna, a ceramic resonator, a stamped metal antenna, or a laser direct structuring antenna.

In several embodiments, the first tunable frequency response circuit is integrated on a module substrate. According to a number of embodiments, the first antenna element and the first tuning conductor are integrated on the module substrate. In accordance with various embodiments, the first antenna element and the first tuning conductor are integrated on a glass substrate that is coupled to the module substrate.

In certain embodiments, the present disclosure relates to a method of tuning a frequency response of an antenna system. The method includes amplifying a radio frequency signal using a power amplifier, providing the amplified radio frequency signal to a signal feed of a first antenna element, and tuning the first antenna element using a first tuning conductor electromagnetically coupled to the first antenna element and operable to load the first antenna element, including controlling an impedance of a first tunable frequency response circuit that is electrically connected to the first tuning conductor.

In various embodiments, the method further includes selecting the impedance of the first tunable frequency response circuit based on data received over a bus.

In several embodiments, controlling the impedance of the first tunable frequency response circuit includes controlling a plurality of selection switches of a plurality of circuit branches. According to a number of embodiments, each of the plurality of circuit branches includes a capacitor in series with a corresponding one of the plurality of selection switches. In accordance with various embodiments, each of the plurality of branches includes an inductor in series with a corresponding one of the plurality of selection switches. According to some embodiments, each of the plurality of branches includes an inductor and a capacitor in series with a corresponding one of the plurality of selection switches.

In various embodiments, tuning the first antenna element includes compensating for a mismatch of the first antenna element.

In several embodiments, tuning the first antenna element includes tuning an antenna gain of the first antenna element.

In some embodiments, tuning the first antenna element includes tuning a center frequency of the first antenna element.

In various embodiments, tuning the first antenna element includes tuning a bandwidth of the first antenna element.

In several embodiments, tuning the first antenna element includes tuning a location in frequency of a secondary resonance of the first antenna element.

In some embodiments, the method further includes tuning the first antenna element using a second tuning conductor electromagnetically coupled to the first antenna element and operable to load the first antenna element, including controlling an impedance of a second tunable frequency response circuit that is electrically connected to the second tuning conductor. According to a number of embodiments, the first tuning conductor and the second tuning conductor are positioned along different sides of the first antenna element.

In various embodiments, the method further includes tuning a second antenna element using the first tuning conductor.

In several embodiments, the method further includes tuning a second antenna element using a second tuning conductor electromagnetically coupled to the second antenna element and operable to load the second antenna element, including controlling an impedance of a second tunable frequency response circuit that is electrically connected to the second tuning conductor.

In various embodiments, the first antenna element is a patch antenna, a dipole antenna, a ceramic resonator, a stamped metal antenna, or a laser direct structuring antenna.

In some embodiments, the method further includes tuning the first antenna element using a second tunable frequency response circuit that is electrically connected to a ground feed of the first antenna element.

In certain embodiments, the present disclosure relates to an antenna system. The antenna system includes an antenna element including a signal feed configured to handle a radio frequency signal, and a ground feed, and a first tunable frequency response circuit electrically connected to the ground feed, the first tunable frequency response circuit having an impedance that is controllable to tune the antenna element.

In various embodiments, the first tunable frequency response circuit is electrically connected between the ground feed and ground.

In several embodiments, the first tunable frequency response circuit is controllable by data received over a bus.

In some embodiments, the first tunable frequency response circuit includes a plurality of circuit branches electrically connected in parallel and each including a selection switch for activating the circuit branch. According to a number of embodiments, each of the plurality of circuit branches includes a capacitor in series with the selection switch. In accordance with several embodiments, each of the plurality of circuit branches includes an inductor in series with the selection switch. According to various embodiments, each of the plurality of circuit branches includes an inductor and a capacitor in series with the selection switch.

In several embodiments, the impedance of the first tunable frequency response circuit is operable to compensate for a mismatch of the antenna element.

In various embodiments, the impedance of the first tunable frequency response circuit is operable to tune an antenna gain of the antenna element.

In some embodiments, the impedance of the first tunable frequency response circuit is operable to tune a center frequency of the antenna element.

In several embodiments, the impedance of the first tunable frequency response circuit is operable to tune a bandwidth of the antenna element.

In various embodiments, the impedance of the first tunable frequency response circuit is operable to tune a location in frequency of a secondary resonance of the antenna element.

In some embodiments, the antenna system further includes a tuning conductor electromagnetically coupled to the antenna element and operable to load the antenna element. According to a number of embodiments, the antenna system further includes a second tunable frequency response circuit electrically connected to the tuning conductor.

In several embodiments, the antenna element is a patch antenna, a dipole antenna, a ceramic resonator, a stamped metal antenna, or a laser direct structuring antenna.

In various embodiments, the first tunable frequency response circuit is integrated on a module substrate. According to a number of embodiments, the antenna element is integrated on the module substrate. In accordance with several embodiments, the antenna element is integrated on a glass substrate that is coupled to the module substrate.

In certain embodiments, the present disclosure relates to a mobile device. The mobile device includes an antenna element including a ground feed, and a signal feed configured to receive an amplified radio frequency signal. The mobile device further includes a front end system including a power amplifier configured to amplify a radio frequency signal to generate the amplified radio frequency signal and a first tunable frequency response circuit electrically connected to the ground feed, the first tunable frequency response circuit having an impedance that is controllable to tune the antenna element.

In various embodiments, the first tunable frequency response circuit is electrically connected between the ground feed and ground.

In several embodiments, the first tunable frequency response circuit is controllable by data received over a bus.

In some embodiments, the first tunable frequency response circuit includes a plurality of circuit branches electrically connected in parallel and each including a selection switch for activating the circuit branch. According to a number of embodiments, each of the plurality of circuit branches includes a capacitor in series with the selection switch. In accordance with various embodiments, each of the plurality of circuit branches includes an inductor in series with the selection switch. According to several embodiments, each of the plurality of circuit branches includes an inductor and a capacitor in series with the selection switch.

In various embodiments, the impedance of the first tunable frequency response circuit is operable to compensate for a mismatch of the antenna element.

In several embodiments, the impedance of the first tunable frequency response circuit is operable to tune an antenna gain of the antenna element.

In some embodiments, the impedance of the first tunable frequency response circuit is operable to tune a center frequency of the antenna element.

In a number of embodiments, the impedance of the first tunable frequency response circuit is operable to tune a bandwidth of the antenna element.

In various embodiments, the impedance of the first tunable frequency response circuit is operable to tune a location in frequency of a secondary resonance of the antenna element.

In several embodiments, the mobile device further includes a tuning conductor electromagnetically coupled to the antenna element and operable to load the antenna element. According to a number of embodiments, the mobile device further includes a second tunable frequency response circuit electrically connected to the tuning conductor.

In various embodiments, the antenna element is a patch antenna, a dipole antenna, a ceramic resonator, a stamped metal antenna, or a laser direct structuring antenna.

In some embodiments, the first tunable frequency response circuit is integrated on a module substrate. According to a number of embodiments, the antenna element is integrated on the module substrate. In accordance with various embodiments, the antenna element is integrated on a glass substrate that is coupled to the module substrate.

In certain embodiments, the present disclosure relates to a method of tuning a frequency response of an antenna system. The method includes amplifying a radio frequency signal using a power amplifier, providing the amplified radio frequency signal to a signal feed of an antenna element, and tuning the antenna element by controlling an impedance of a first tunable frequency response circuit that is electrically connected to a ground feed of the antenna element.

In various embodiments, the first tunable frequency response circuit is electrically connected between the ground feed and ground.

In several embodiments, the method further includes controlling the impedance of the first tunable frequency response circuit based on data received over a bus.

In some embodiments, controlling the impedance of the first tunable frequency response circuit includes controlling a plurality of selection switches of a plurality of circuit branches. According to a number of embodiments, each of the plurality of circuit branches includes a capacitor in series with the selection switch. In accordance with various embodiments, each of the plurality of circuit branches includes an inductor in series with the selection switch. In accordance with several embodiments, each of the plurality of circuit branches includes an inductor and a capacitor in series with the selection switch.

In some embodiments, tuning the antenna element includes compensating for a mismatch of the antenna element.

In several embodiments, tuning the antenna element includes tuning an antenna gain of the antenna element.

In various embodiments, tuning the antenna element includes tuning a center frequency of the antenna element.

In a number of embodiments, tuning the antenna element includes tuning a bandwidth of the antenna element.

In several embodiments, tuning the antenna element includes tuning a location in frequency of a secondary resonance of the antenna element.

In various embodiments, the method further includes tuning the antenna element using a tuning conductor electromagnetically coupled to the antenna element and operable to load the antenna element.

In several embodiments, the method further includes tuning the antenna element using a second tunable frequency response circuit electrically connected to the tuning conductor.

In a number of embodiments, the antenna element is a patch antenna, a dipole antenna, a ceramic resonator, a stamped metal antenna, or a laser direct structuring antenna.

BRIEF DESCRIPTION OF THE DRAWINGS

Embodiments of this disclosure will now be described, by way of non-limiting example, with reference to the accompanying drawings.

DETAILED DESCRIPTION OF CERTAIN EMBODIMENTS

Figure 1:
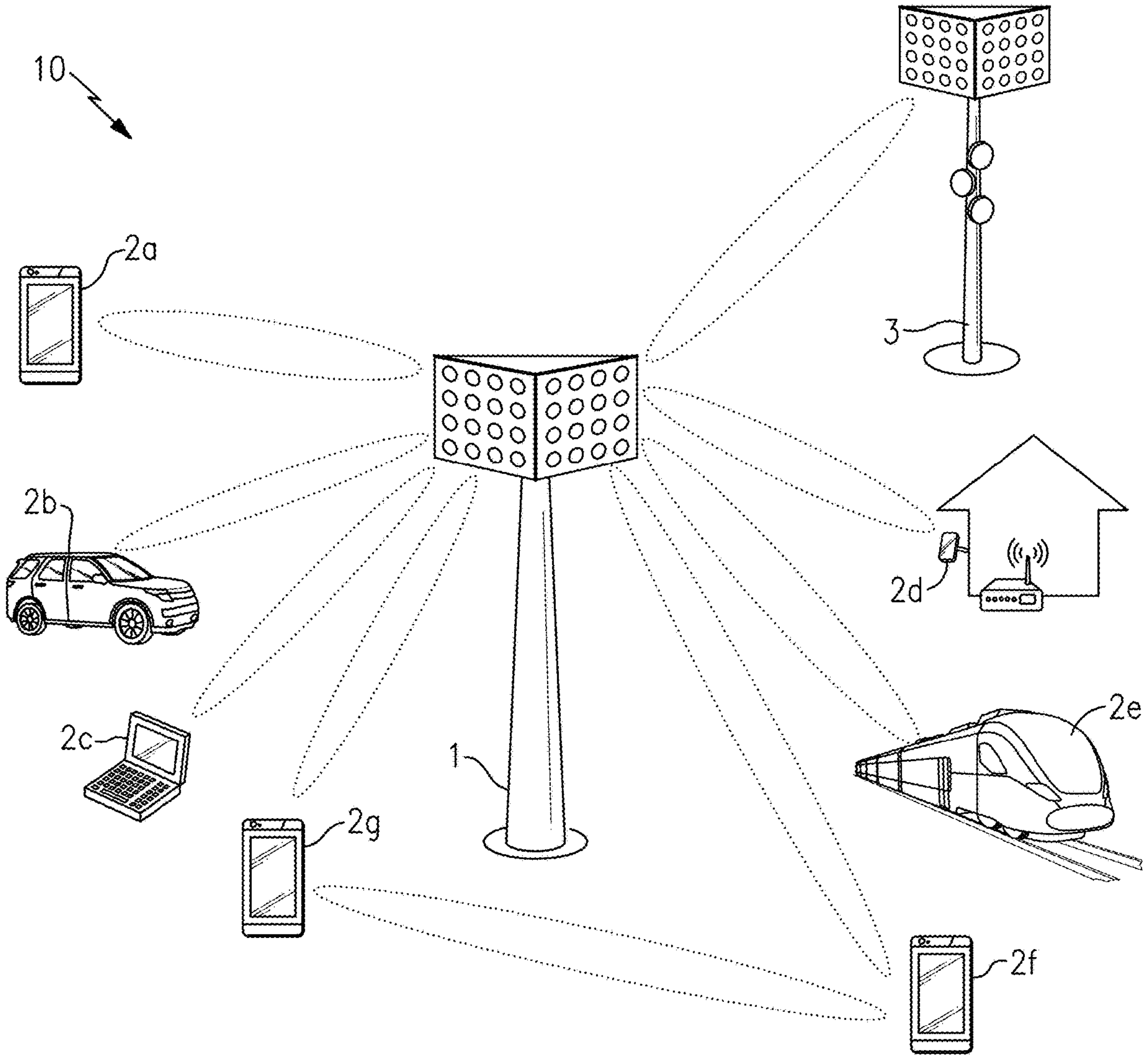
FIG. 1 is a schematic diagram of one example of a communication network.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The International Telecommunication Union (ITU) is a specialized agency of the United Nations (UN) responsible for global issues concerning information and communication technologies, including the shared global use of radio spectrum.

The 3rd Generation Partnership Project (3GPP) is a collaboration between groups of telecommunications standard bodies across the world, such as the Association of Radio Industries and Businesses (ARIB), the Telecommunications Technology Committee (TTC), the China Communications Standards Association (CCSA), the Alliance for Telecommunications Industry Solutions (ATIS), the Telecommunications Technology Association (TTA), the European Telecommunications Standards Institute (ETSI), and the Telecommunications Standards Development Society, India (TSDSI).

Working within the scope of the ITU, 3GPP develops and maintains technical specifications for a variety of mobile communication technologies, including, for example, second generation (2G) technology (for instance, Global System for Mobile Communications (GSM) and Enhanced Data Rates for GSM Evolution (EDGE)), third generation (3G) technology (for instance, Universal Mobile Telecommunications System (UMTS) and High Speed Packet Access (HSPA)), and fourth generation (4G) technology (for instance, Long Term Evolution (LTE) and LTE-Advanced).

The technical specifications controlled by 3GPP can be expanded and revised by specification releases, which can span multiple years and specify a breadth of new features and evolutions.

In one example, 3GPP introduced carrier aggregation (CA) for LTE in Release 10. Although initially introduced with two downlink carriers, 3GPP expanded carrier aggregation in Release 14 to include up to five downlink carriers and up to three uplink carriers. Other examples of new features and evolutions provided by 3GPP releases include, but are not limited to, License Assisted Access (LAA), enhanced LAA (eLAA), Narrowband Internet of things (NB-IOT), Vehicle-to-Everything (V2X), and High Power User Equipment (HPUE).

3GPP introduced Phase 1 of fifth generation (5G) technology in Release 15, and introduced Phase 2 of 5G technology in Release 16. Subsequent 3GPP releases will further evolve and expand 5G technology. 5G technology is also referred to herein as 5G New Radio (NR).

5G NR supports or plans to support a variety of features, such as communications over millimeter wave spectrum, beamforming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR.

FIG. 1 is a schematic diagram of one example of a communication network 10. The communication network 10 includes a macro cell base station 1, a small cell base station 3, and various examples of user equipment (UE), including a first mobile device 2*a*, a wireless-connected car 2*b*, a laptop 2*c*, a stationary wireless device 2*d*, a wireless-connected train 2*e*, a second mobile device 2*f*, and a third mobile device 2*g*.

Although specific examples of base stations and user equipment are illustrated in FIG. 1, a communication network can include base stations and user equipment of a wide variety of types and/or numbers.

For instance, in the example shown, the communication network 10 includes the macro cell base station 1 and the small cell base station 3. The small cell base station 3 can operate with relatively lower power, shorter range, and/or with fewer concurrent users relative to the macro cell base station 1. The small cell base station 3 can also be referred to as a femtocell, a picocell, or a microcell. Although the communication network 10 is illustrated as including two base stations, the communication network 10 can be implemented to include more or fewer base stations and/or base stations of other types.

Although various examples of user equipment are shown, the teachings herein are applicable to a wide variety of user equipment, including, but not limited to, mobile phones, tablets, laptops, IoT devices, wearable electronics, customer premises equipment (CPE), wireless-connected vehicles, wireless relays, and/or a wide variety of other communication devices. Furthermore, user equipment includes not only currently available communication devices that operate in a cellular network, but also subsequently developed communication devices that will be readily implementable with the inventive systems, processes, methods, and devices as described and claimed herein.

The illustrated communication network 10 of FIG. 1 supports communications using a variety of cellular technologies, including, for example, 4G LTE and 5G NR. In certain implementations, the communication network 10 is further adapted to provide a wireless local area network (WLAN), such as WiFi. Although various examples of communication technologies have been provided, the communication network 10 can be adapted to support a wide variety of communication technologies.

Various communication links of the communication network 10 have been depicted in FIG. 1. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

In certain implementations, user equipment can communicate with a base station using one or more of 4G LTE, 5G NR, and WiFi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed WiFi frequencies).

As shown in FIG. 1, the communication links include not only communication links between UE and base stations, but also UE to UE communications and base station to base station communications. For example, the communication network 10 can be implemented to support self-fronthaul and/or self-backhaul (for instance, as between mobile device 2*g* and mobile device 2*f*).

The communication links can operate over a wide variety of frequencies. In certain implementations, communications are supported using 5G NR technology over one or more frequency bands that are less than 6 Gigahertz (GHz) and/or over one or more frequency bands that are greater than 6 GHz. For example, the communication links can serve Frequency Range 1 (FR1), Frequency Range 2 (FR2), or a combination thereof. In one embodiment, one or more of the mobile devices support a HPUE power class specification.

In certain implementations, a base station and/or user equipment communicates using beamforming. For example, beamforming can be used to focus signal strength to overcome path losses, such as high loss associated with communicating over high signal frequencies. In certain embodiments, user equipment, such as one or more mobile phones, communicate using beamforming on millimeter wave frequency bands in the range of 30 GHz to 300 GHz and/or upper centimeter wave frequencies in the range of 6 GHz to 30 GHz, or more particularly, 24 GHz to 30 GHz. Cellular user equipment can communicate using beamforming and/or other techniques over a wide range of frequencies, including, for example, FR2-1 (24 GHz to 52 GHz), FR2-2 (52 GHz to 71 GHz), and/or FR1 (400 MHz to 7125 MHz).

Different users of the communication network 10 can share available network resources, such as available frequency spectrum, in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user. Ultra-reliable low latency communications (uRLLC) refers to technology for communication with very low latency, for instance, less than 2 milliseconds. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IoT) applications.

The communication network 10 of FIG. 1 can be used to support a wide variety of advanced communication features, including, but not limited to, eMBB, uRLLC, and/or mMTC.

Figure 2A:
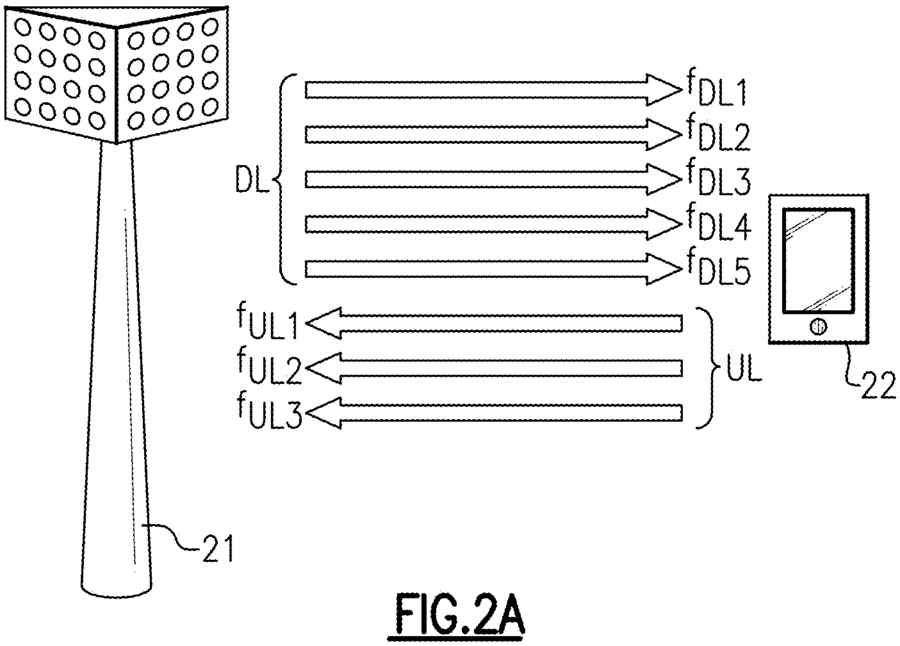
FIG. 2A is a schematic diagram of one example of a communication link using carrier aggregation.

FIG. 2A is a schematic diagram of one example of a communication link using carrier aggregation. Carrier aggregation can be used to widen bandwidth of the communication link by supporting communications over multiple frequency carriers, thereby increasing user data rates and enhancing network capacity by utilizing fragmented spectrum allocations.

In the illustrated example, the communication link is provided between a base station 21 and a mobile device 22. As shown in FIG. 2A, the communications link includes a downlink channel used for RF communications from the base station 21 to the mobile device 22, and an uplink channel used for RF communications from the mobile device 22 to the base station 21.

Although FIG. 2A illustrates carrier aggregation in the context of FDD communications, carrier aggregation can also be used for TDD communications.

In certain implementations, a communication link can provide asymmetrical data rates for a downlink channel and an uplink channel. For example, a communication link can be used to support a relatively high downlink data rate to enable high speed streaming of multimedia content to a mobile device, while providing a relatively slower data rate for uploading data from the mobile device to the cloud.

In the illustrated example, the base station 21 and the mobile device 22 communicate via carrier aggregation, which can be used to selectively increase bandwidth of the communication link. Carrier aggregation includes contiguous aggregation, in which contiguous carriers within the same operating frequency band are aggregated. Carrier aggregation can also be non-contiguous, and can include carriers separated in frequency within a common band or in different bands.

In the example shown in FIG. 2A, the uplink channel includes three aggregated component carriers $f_{UL1}$, $f_{UL2}$, and $f_{UL3}$. Additionally, the downlink channel includes five aggregated component carriers $f_{DL1}$, $f_{DL2}$, $f_{DL3}$, $f_{DL4}$, and $f_{DL5}$. Although one example of component carrier aggregation is shown, more or fewer carriers can be aggregated for uplink and/or downlink. Moreover, a number of aggregated carriers can be varied over time to achieve desired uplink and downlink data rates.

For example, a number of aggregated carriers for uplink and/or downlink communications with respect to a particular mobile device can change over time. For example, the number of aggregated carriers can change as the device moves through the communication network and/or as network usage changes over time.

Figure 2B:
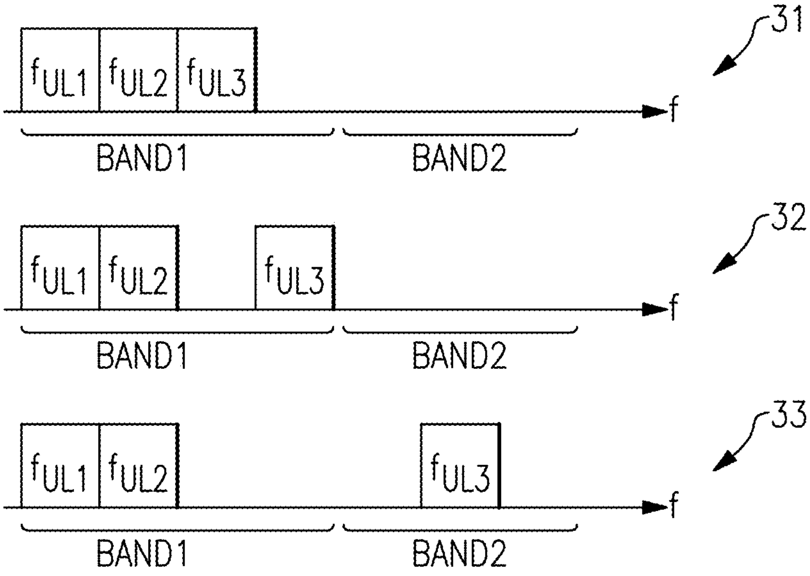
FIG. 2B illustrates various examples of uplink carrier aggregation for the communication link of FIG. 2A.

FIG. 2B illustrates various examples of uplink carrier aggregation for the communication link of FIG. 2A. FIG. 2B includes a first carrier aggregation scenario 31, a second carrier aggregation scenario 32, and a third carrier aggregation scenario 33, which schematically depict three types of carrier aggregation.

The carrier aggregation scenarios 31-33 illustrate different spectrum allocations for a first component carrier full, a second component carrier $f_{UL2}$, and a third component carrier $f_{UL3}$. Although FIG. 2B is illustrated in the context of aggregating three component carriers, carrier aggregation can be used to aggregate more or fewer carriers. Moreover, although illustrated in the context of uplink, the aggregation scenarios are also applicable to downlink.

The first carrier aggregation scenario 31 illustrates intra-band contiguous carrier aggregation, in which component carriers that are adjacent in frequency and in a common frequency band are aggregated. For example, the first carrier aggregation scenario 31 depicts aggregation of component carriers $f_{UL1}$, $f_{UL2}$, and $f_{UL3}$ that are contiguous and located within a first frequency band BAND1.

With continuing reference to FIG. 2B, the second carrier aggregation scenario 32 illustrates intra-band non-continuous carrier aggregation, in which two or more components carriers that are non-adjacent in frequency and within a common frequency band are aggregated. For example, the second carrier aggregation scenario 32 depicts aggregation of component carriers $f_{UL1}$, $f_{UL2}$, and $f_{UL3}$ that are non-contiguous, but located within a first frequency band BAND1.

The third carrier aggregation scenario 33 illustrates inter-band non-contiguous carrier aggregation, in which component carriers that are non-adjacent in frequency and in multiple frequency bands are aggregated. For example, the third carrier aggregation scenario 33 depicts aggregation of component carriers $f_{UL1}$ and $f_{UL2}$ of a first frequency band BAND1 with component carrier $f_{UL3}$ of a second frequency band BAND2.

Figure 2C:
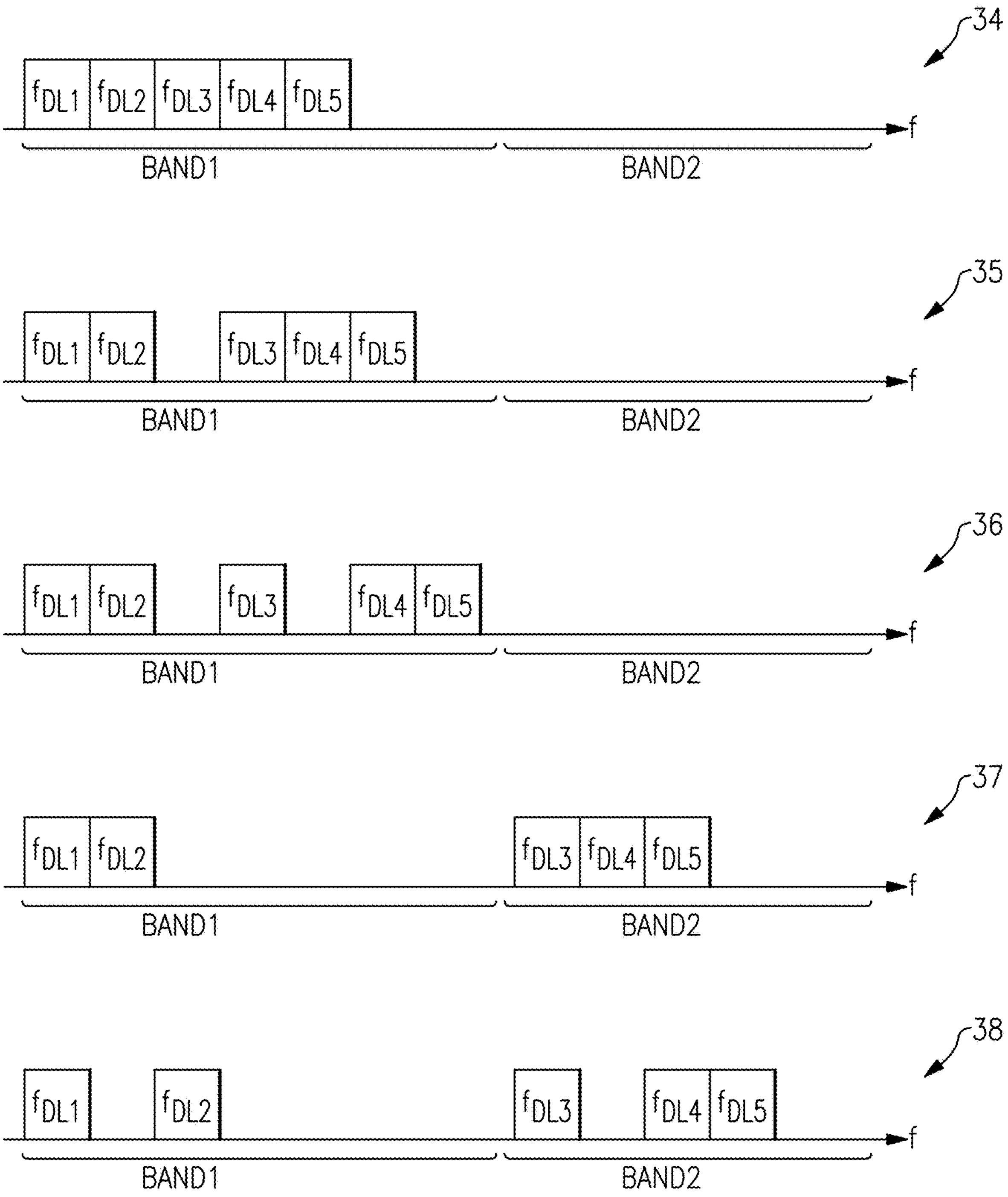
FIG. 2C illustrates various examples of downlink carrier aggregation for the communication link of FIG. 2A.

FIG. 2C illustrates various examples of downlink carrier aggregation for the communication link of FIG. 2A. The examples depict various carrier aggregation scenarios 34-38 for different spectrum allocations of a first component carrier $f_{DL1}$, a second component carrier $f_{DL2}$, a third component carrier $f_{DL3}$, a fourth component carrier $f_{DL4}$, and a fifth component carrier $f_{DL5}$. Although FIG. 2C is illustrated in the context of aggregating five component carriers, carrier aggregation can be used to aggregate more or fewer carriers.

Moreover, although illustrated in the context of downlink, the aggregation scenarios are also applicable to uplink.

The first carrier aggregation scenario 34 depicts aggregation of component carriers that are contiguous and located within the same frequency band. Additionally, the second carrier aggregation scenario 35 and the third carrier aggregation scenario 36 illustrates two examples of aggregation that are non-contiguous, but located within the same frequency band. Furthermore, the fourth carrier aggregation scenario 37 and the fifth carrier aggregation scenario 38 illustrates two examples of aggregation in which component carriers that are non-adjacent in frequency and in multiple frequency bands are aggregated. As a number of aggregated component carriers increases, a complexity of possible carrier aggregation scenarios also increases.

With reference to FIGS. 2A-2C, the individual component carriers used in carrier aggregation can be of a variety of frequencies, including, for example, frequency carriers in the same band or in multiple bands. Additionally, carrier aggregation is applicable to implementations in which the individual component carriers are of about the same bandwidth as well as to implementations in which the individual component carriers have different bandwidths.

Certain communication networks allocate a particular user device with a primary component carrier (PCC) or anchor carrier for uplink and a PCC for downlink. Additionally, when the mobile device communicates using a single frequency carrier for uplink or downlink, the user device communicates using the PCC. To enhance bandwidth for uplink communications, the uplink PCC can be aggregated with one or more uplink secondary component carriers (SCCs). Additionally, to enhance bandwidth for downlink communications, the downlink PCC can be aggregated with one or more downlink SCCs.

In certain implementations, a communication network provides a network cell for each component carrier. Additionally, a primary cell can operate using a PCC, while a secondary cell can operate using a SCC. The primary and secondary cells may have different coverage areas, for instance, due to differences in frequencies of carriers and/or network environment.

License assisted access (LAA) refers to downlink carrier aggregation in which a licensed frequency carrier associated with a mobile operator is aggregated with a frequency carrier in unlicensed spectrum, such as WiFi. LAA employs a downlink PCC in the licensed spectrum that carries control and signaling information associated with the communication link, while unlicensed spectrum is aggregated for wider downlink bandwidth when available. LAA can operate with dynamic adjustment of secondary carriers to avoid WiFi users and/or to coexist with WiFi users. Enhanced license assisted access (eLAA) refers to an evolution of LAA that aggregates licensed and unlicensed spectrum for both downlink and uplink. Furthermore, NR-U can operate on top of LAA/eLAA over a 5 GHz band (5150 to 5925 MHz) and/or a 6 GHz band (5925 MHz to 7125 MHz).

Figure 3A:
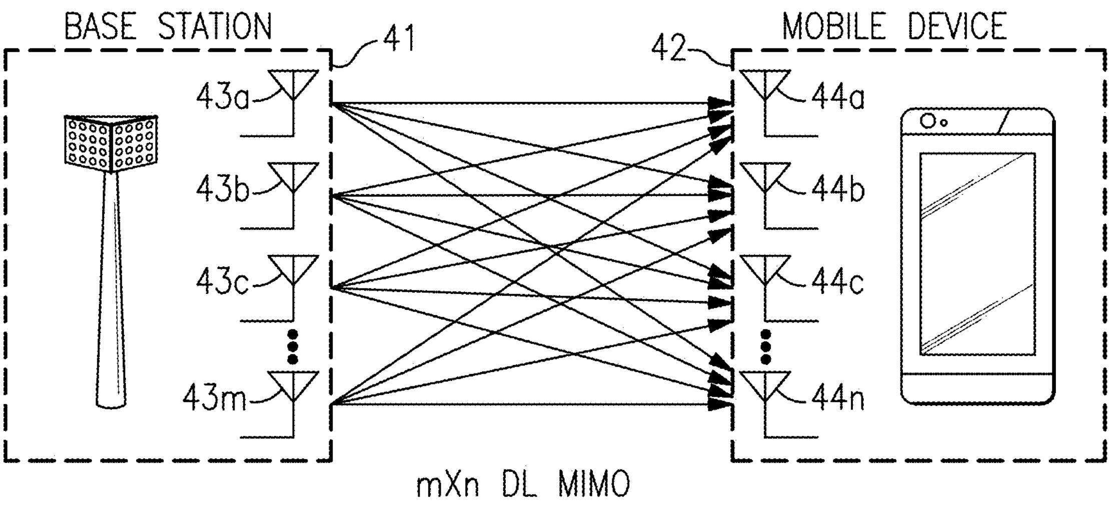
FIG. 3A is a schematic diagram of one example of a downlink channel using multi-input and multi-output (MIMO) communications.
Figure 3B:
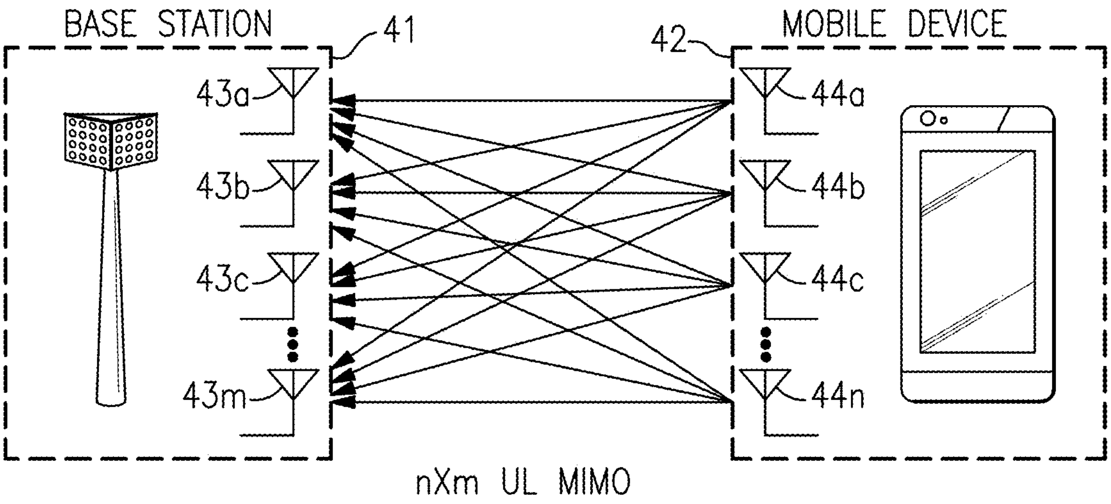
FIG. 3B is schematic diagram of one example of an uplink channel using MIMO communications.

FIG. 3A is a schematic diagram of one example of a downlink channel using multi-input and multi-output (MIMO) communications. FIG. 3B is schematic diagram of one example of an uplink channel using MIMO communications.

MIMO communications use multiple antennas for simultaneously communicating multiple data streams over common frequency spectrum. In certain implementations, the data streams operate with different reference signals to enhance data reception at the receiver. MIMO communications benefit from higher SNR, improved coding, and/or reduced signal interference due to spatial multiplexing differences of the radio environment.

MIMO order refers to a number of separate data streams sent or received. For instance, MIMO order for downlink communications can be described by a number of transmit antennas of a base station and a number of receive antennas for UE, such as a mobile device. For example, two-by-two (2×2) DL MIMO refers to MIMO downlink communications using two base station antennas and two UE antennas. Additionally, four-by-four (4×4) DL MIMO refers to MIMO downlink communications using four base station antennas and four UE antennas.

In the example shown in FIG. 3A, downlink MIMO communications are provided by transmitting using M antennas 43*a*, 43*b*, 43*c*, . . . 43*m* of the base station 41 and receiving using N antennas 44*a*, 44*b*, 44*c*, . . . 44*n* of the mobile device 42. Accordingly, FIG. 3A illustrates an example of m×n DL MIMO.

Likewise, MIMO order for uplink communications can be described by a number of transmit antennas of UE, such as a mobile device, and a number of receive antennas of a base station. For example, 2×2 UL MIMO refers to MIMO uplink communications using two UE antennas and two base station antennas. Additionally, 4×4 UL MIMO refers to MIMO uplink communications using four UE antennas and four base station antennas.

In the example shown in FIG. 3B, uplink MIMO communications are provided by transmitting using N antennas 44*a*, 44*b*, 44*c*, . . . 44*n* of the mobile device 42 and receiving using M antennas 43*a*, 43*b*, 43*c*, . . . 43*m* of the base station 41. Accordingly, FIG. 3B illustrates an example of n×m UL MIMO.

By increasing the level or order of MIMO, bandwidth of an uplink channel and/or a downlink channel can be increased.

MIMO communications are applicable to communication links of a variety of types, such as FDD communication links and TDD communication links.

Figure 3C:
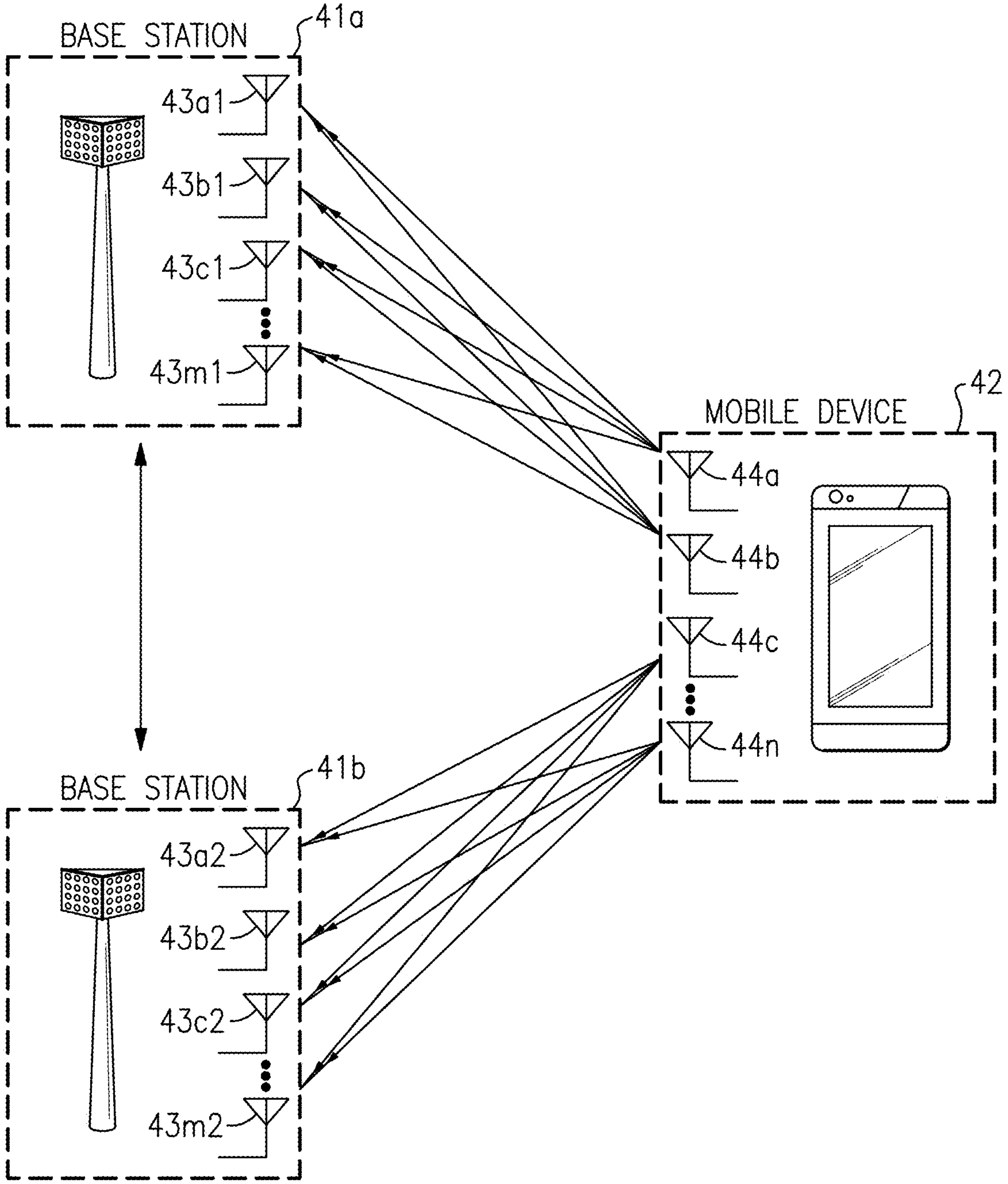
FIG. 3C is schematic diagram of another example of an uplink channel using MIMO communications.

FIG. 3C is schematic diagram of another example of an uplink channel using MIMO communications. In the example shown in FIG. 3C, uplink MIMO communications are provided by transmitting using N antennas 44*a*, 44*b*, 44*c*, . . . 44*n* of the mobile device 42. Additional a first portion of the uplink transmissions are received using M antennas 43*a*1, 43*b*1, 43*c*1, . . . 43*m*1 of a first base station 41*a*, while a second portion of the uplink transmissions are received using M antennas 43*a*2, 43*b*2, 43*c*2, . . . 43*m*2 of a second base station 41*b*. Additionally, the first base station 41*a* and the second base station 41*b* communication with one another over wired, optical, and/or wireless links.

The MIMO scenario of FIG. 3C illustrates an example in which multiple base stations cooperate to facilitate MIMO communications.

Figure 4A:
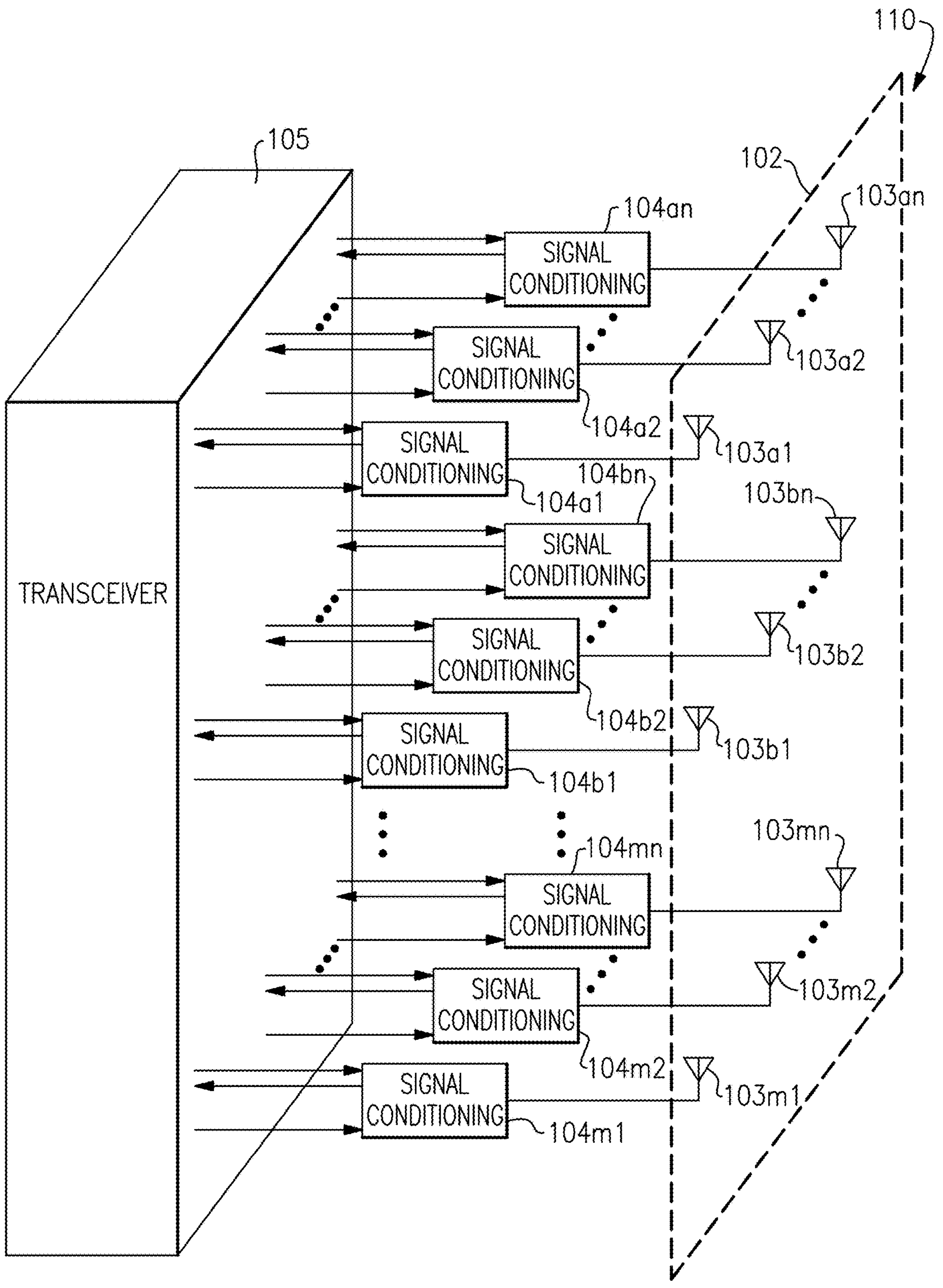
FIG. 4A is a schematic diagram of one example of a communication system that operates with beamforming.

FIG. 4A is a schematic diagram of one example of a communication system 110 that operates with beamforming. The communication system 110 includes a transceiver 105, signal conditioning circuits 104*a*1, 104*a*2 . . . 104*an*, 104*b*1, 104*b*2 . . . 104*bn*, 104*m*1, 104*m*2 . . . 104*mn*, and an antenna array 102 that includes antenna elements 103*a*1, 103*a*2 . . . 103*an*, 103*b*1, 103*b*2 . . . 103*bn*, 103*m*1, 103*m*2 . . . 103*mn*.

Communications systems that communicate using millimeter wave carriers (for instance, 30 GHz to 300 GHz), centimeter wave carriers (for instance, 3 GHz to 30 GHz), and/or other frequency carriers can employ an antenna array to provide beam formation and directivity for transmission and/or reception of signals.

For example, in the illustrated embodiment, the communication system 110 includes an array 102 of m×n antenna elements, which are each controlled by a separate signal conditioning circuit, in this embodiment. As indicated by the ellipses, the communication system 110 can be implemented with any suitable number of antenna elements and signal conditioning circuits.

With respect to signal transmission, the signal conditioning circuits can provide transmit signals to the antenna array 102 such that signals radiated from the antenna elements combine using constructive and destructive interference to generate an aggregate transmit signal exhibiting beam-like qualities with more signal strength propagating in a given direction away from the antenna array 102.

In the context of signal reception, the signal conditioning circuits process the received signals (for instance, by separately controlling received signal phases) such that more signal energy is received when the signal is arriving at the antenna array 102 from a particular direction. Accordingly, the communication system 110 also provides directivity for reception of signals.

The relative concentration of signal energy into a transmit beam or a receive beam can be enhanced by increasing the size of the array. For example, with more signal energy focused into a transmit beam, the signal is able to propagate for a longer range while providing sufficient signal level for RF communications. For instance, a signal with a large proportion of signal energy focused into the transmit beam can exhibit high effective isotropic radiated power (EIRP).

In the illustrated embodiment, the transceiver 105 provides transmit signals to the signal conditioning circuits and processes signals received from the signal conditioning circuits. As shown in FIG. 4A, the transceiver 105 generates control signals for the signal conditioning circuits. The control signals can be used for a variety of functions, such as controlling the gain and phase of transmitted and/or received signals to control beamforming.

Figure 4B:
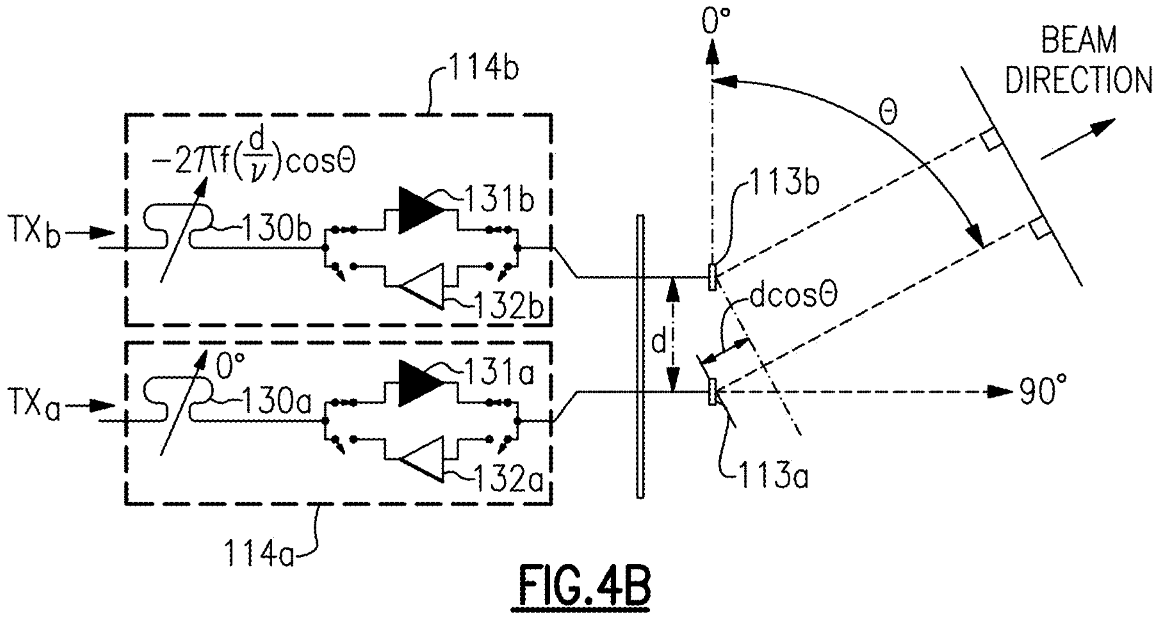
FIG. 4B is a schematic diagram of one example of beamforming to provide a transmit beam.

FIG. 4B is a schematic diagram of one example of beamforming to provide a transmit beam. FIG. 4B illustrates a portion of a communication system including a first signal conditioning circuit 114*a*, a second signal conditioning circuit 114*b*, a first antenna element 113*a*, and a second antenna element 113*b*.

Although illustrated as included two antenna elements and two signal conditioning circuits, a communication system can include additional antenna elements and/or signal conditioning circuits. For example, FIG. 4B illustrates one embodiment of a portion of the communication system 110 of FIG. 4A.

The first signal conditioning circuit 114*a* includes a first phase shifter 130*a*, a first power amplifier 131*a*, a first low noise amplifier (LNA) 132*a*, and switches for controlling selection of the power amplifier 131*a* or LNA 132*a*. Additionally, the second signal conditioning circuit 114*b* includes a second phase shifter 130*b*, a second power amplifier 131*b*, a second LNA 132*b*, and switches for controlling selection of the power amplifier 131*b* or LNA 132*b*.

Although one embodiment of signal conditioning circuits is shown, other implementations of signal conditioning circuits are possible. For instance, in one example, a signal conditioning circuit includes one or more band filters, duplexers, and/or other components.

In the illustrated embodiment, the first antenna element 113*a* and the second antenna element 113*b* are separated by a distance d. Additionally, FIG. 4B has been annotated with an angle ⊖, which in this example has a value of about 90° when the transmit beam direction is substantially perpendicular to a plane of the antenna array and a value of about 0° when the transmit beam direction is substantially parallel to the plane of the antenna array.

By controlling the relative phase of the transmit signals provided to the antenna elements 113*a*, 113*b*, a desired transmit beam angle ⊖ can be achieved. For example, when the first phase shifter 130*a* has a reference value of 0°, the second phase shifter 130*b* can be controlled to provide a phase shift of about $-2\pi f(d/v)\cos\Theta$ radians, where f is the fundamental frequency of the transmit signal, d is the distance between the antenna elements, v is the velocity of the radiated wave, and π is the mathematic constant pi.

In certain implementations, the distance d is implemented to be about ½λ, where λ is the wavelength of the fundamental component of the transmit signal. In such implementations, the second phase shifter 130*b* can be controlled to provide a phase shift of about $-\pi\cos\Theta$ radians to achieve a transmit beam angle ⊖.

Accordingly, the relative phase of the phase shifters 130*a*, 130*b* can be controlled to provide transmit beamforming. In certain implementations, a baseband processor and/or a transceiver (for example, the transceiver 105 of FIG. 4A) controls phase values of one or more phase shifters and gain values of one or more controllable amplifiers to control beamforming.

Figure 4C:
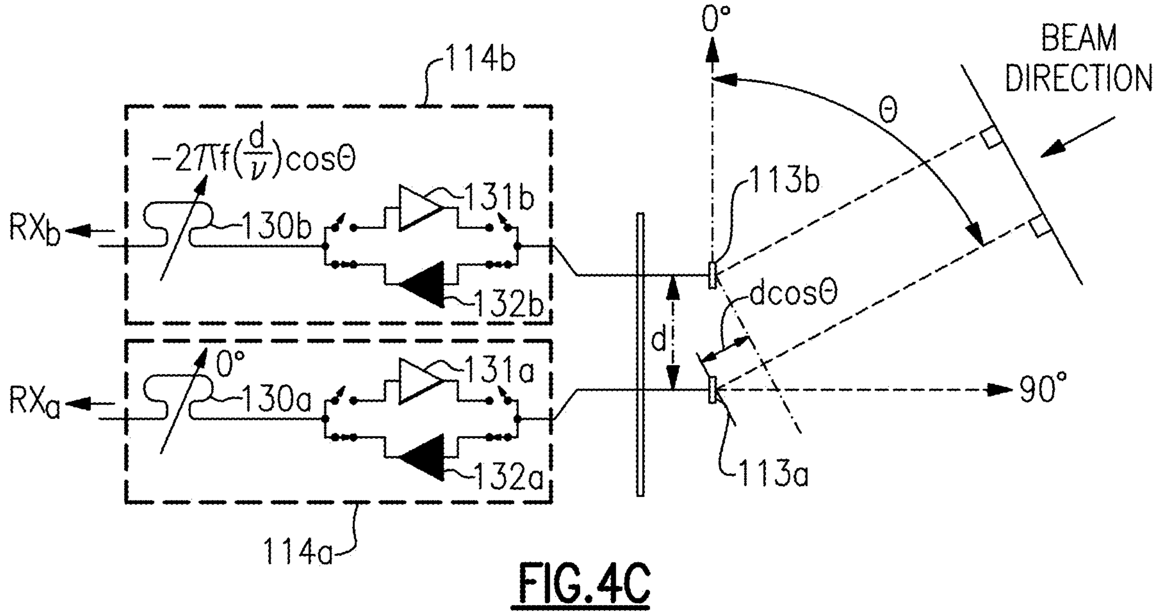
FIG. 4C is a schematic diagram of one example of beamforming to provide a receive beam.

FIG. 4C is a schematic diagram of one example of beamforming to provide a receive beam. FIG. 4C is similar to FIG. 4B, except that FIG. 4C illustrates beamforming in the context of a receive beam rather than a transmit beam.

As shown in FIG. 4C, a relative phase difference between the first phase shifter 130*a* and the second phase shifter 130*b* can be selected to about equal to $-2\pi f(d/v)\cos\Theta$ radians to achieve a desired receive beam angle ⊖. In implementations in which the distance d corresponds to about ½ λ, the phase difference can be selected to about equal to $-\pi\cos\Theta$ radians to achieve a receive beam angle ⊖.

Although various equations for phase values to provide beamforming have been provided, other phase selection values are possible, such as phase values selected based on implementation of an antenna array, implementation of signal conditioning circuits, and/or a radio environment.

The communication networks and systems of FIGS. 1-4C illustrate example radio frequency electronics that can include an antenna system with tunable frequency response circuits. However, the teachings herein are applicable to other implementations of radio frequency electronics.

Examples of Antenna Systems with Tunable Frequency Response Circuits

Antenna systems with tunable frequency response circuits are provided herein. In certain embodiments, an antenna system includes an antenna element and a tuning conductor that is spaced apart from the antenna element and operable to load the antenna element. Thus, the tuning conductor is electromagnetically coupled to the antenna element, for instance, capacitively coupled to the antenna element. Furthermore, a tunable frequency response circuit is electrically connected to the tuning conductor. By implementing the antenna system in this manner, antenna characteristics of the antenna element can be controlled.

Accordingly, the tunable frequency response circuit is controlled to modify the operation of the antenna element. Examples of parameters that can be controlled by the tunable frequency response circuit include, but are not limited to, antenna gain, bandwidth, center frequency, and/or location in frequency of a secondary resonance. Furthermore, by tuning the impedance of the tunable frequency response circuit, compensation for variation or mismatch can be achieved.

In certain implementations, the tunable frequency response circuit is electrically connected between the tuning conductor and ground (for instance, a ground plane of an RF module). The tunable frequency response circuit can be implemented in a wide variety of ways including, but not limited to, a switched-capacitor bank, a switched series inductor-capacitor (LC) bank, a varactor, and/or other suitable tunable impedance can be used for tuning the antenna system's frequency response.

The antenna system can also be implemented to include multiple tuning conductors for tuning one or more antenna elements. In one example, an antenna element is tuned by two or more tuning conductors. In a second example, separate tuning conductors are provided for two or more antenna elements. In a third example, a shared tuning conductor is used to tune two or more antenna elements. One or more of such tuning conductors can include a tunable frequency response circuit.

Additionally or alternatively to including a tunable frequency response circuit for a tuning conductor, an antenna system can include a tunable frequency response circuit electrically connected to a ground feed of an antenna element, such as a patch antenna element. For example, in certain implementations, the antenna element includes a signal feed for receiving an RF signal and a ground feed that is electrically connected to a tunable frequency response circuit.

The tunable frequency response circuit(s) of an antenna system can be tuned over time, thereby reconfiguring the antenna system to provide desired performance characteristics at a given moment. For example, the amount of impedance of the tunable frequency response circuit(s) can be controlled to provide an optimal or near-optimal radiation pattern at a given time for a particular operating environment and/or to compensate for changes in operating conditions over time.

Thus, seamless connectivity between a communication device and a base station can be provided as the communication device moves relative to the base station and/or as a signaling environment changes. In certain implementations, impedance values of one or more tunable frequency response circuit(s) are controlled based on one or more of a receive strength signal indicator (RSSI), an error rate indicator, operating frequency, voltage standing wave ratio (VSWR), and/or other operating characteristic(s).

In certain implementations, the antenna element and the tuning conductor are integrated on a module substrate that includes a semiconductor die attached thereto. Additionally, the tunable frequency response circuit is formed at least in part on the semiconductor die.

However, other configurations are possible, such as implementations in which the antenna element and the tuning conductor are implemented on another substrate (for instance, a glass substrate, metal case, or other suitable structure) that is connected to a module substrate in which the tunable frequency response circuit is integrated. In a first example, the glass substrate corresponds to a glass panel with an antenna element and a tuning conductor integrated therein. In a second example, the glass substrate is part of an integrated passive devices (IPD) die on which the antenna element and the tuning conductor are fabricated. In certain implementations, the substrate (for instance, a glass substrate or metal case) corresponds to an exterior surface of UE.

Figure 5A:
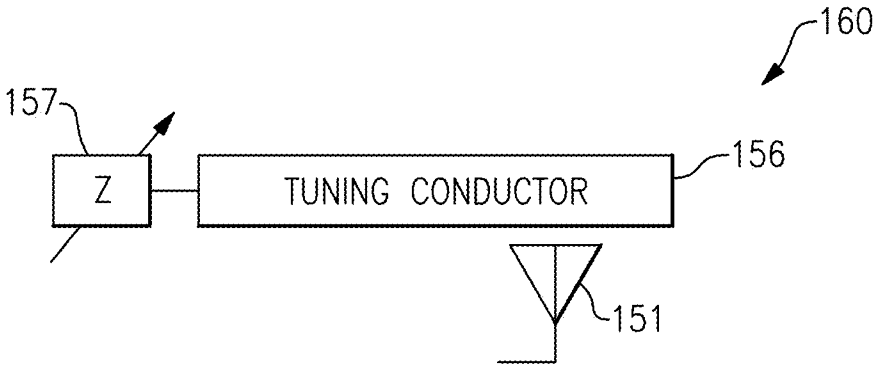
FIG. 5A is a schematic diagram of one embodiment of an antenna system with tuning.

FIG. 5A is a schematic diagram of one embodiment of an antenna system 160 with tuning. The antenna system 160 includes an antenna element 151, a tuning conductor 156, and a tunable frequency response circuit 157.

The tuning conductor 156 is adjacent to and spaced apart from the antenna element 151. Although not directly connected by a conductive material (for instance, by metal), the tuning conductor 156 is electromagnetically coupled (for example, capacitively coupled) to the antenna element 151 and operates to load the antenna element 151, thereby impacting one or more characteristics of the antenna element 151. Although the tuning conductor 156 is illustrated as a rectangular strip of metal, the tuning conductor 156 can be shaped in other ways.

In the illustrated embodiment, the tunable frequency response circuit 157 is electrically connected to the tuning conductor 156. Additionally, the tunable frequency response circuit 157 can be tuned using a control signal to provide a mechanism to tune an antenna characteristic of the antenna element 151, such as antenna gain, bandwidth, center frequency, and/or a location in frequency of a secondary resonance.

By implementing the antenna system 160 in this manner, antenna characteristics of the antenna element 151 can be controlled.

In certain embodiments herein, an antenna element (for example, the antenna element 151 of FIG. 5A) is used to wirelessly transmit and/or receive FR2 signals. For example, Table 1 below depicts various examples of 5G FR2 frequency bands that correspond to example frequency bands for signals transmitted or received by the antenna elements herein.

TABLE 1

| 5G Frequency Band | Band Duplex Type | UL/DL Low [MHz] | UL/DL High [MHz] |
|---|---|---|---|
| n257 | TDD | 26500 | 29500 |
| n258 | TDD | 24250 | 27500 |
| n259 | TDD | 39500 | 43500 |
| n260 | TDD | 37000 | 40000 |
| n261 | TDD | 27500 | 28350 |
| n262 | TDD | 47200 | 48200 |
| n263 | TDD | 57000 | 71000 |

Figure 5B:
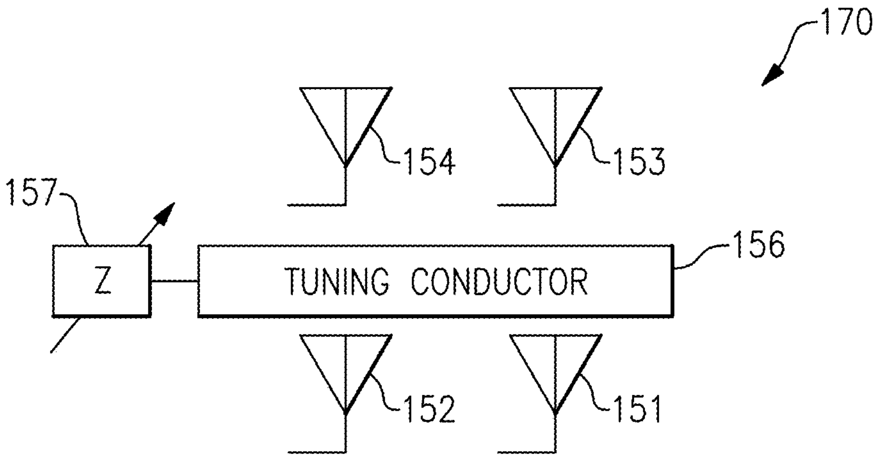
FIG. 5B is a schematic diagram of another embodiment of an antenna system with tuning.

FIG. 5B is a schematic diagram of another embodiment of an antenna system 170 with tuning. The antenna system 170 of FIG. 5B is similar to the antenna system 160 of FIG. 5A, except that the antenna system 170 includes multiple antenna elements 151-154.

Although an example with four antenna elements are shown, the teachings herein are applicable to a wide variety of antenna systems, including configurations using more or fewer antenna elements.

The antenna elements 151-154 can correspond to antenna elements implemented in a wide variety of ways. For instance, examples of antenna elements include, but are not limited to, patch antennas, dipole antennas, ceramic resonators, stamped metal antennas, and/or laser direct structuring antennas.

The tuning conductor 156 serves to load the antenna elements 151-154. Thus, the tunable frequency response circuit 157 can be controlled to tune various frequency characteristics of the antenna elements 151-154.

Although FIG. 5B illustrates an example in which a shared tuning conductor is used to tune two or more antenna elements, the teachings herein are also applicable to implementations in which multiple tuning conductors are provided for tuning one or more antenna elements. In one example, an antenna element is tuned by two or more tuning conductors. In a second example, separate tuning conductors are provided for two or more antenna elements.

Figure 6A:
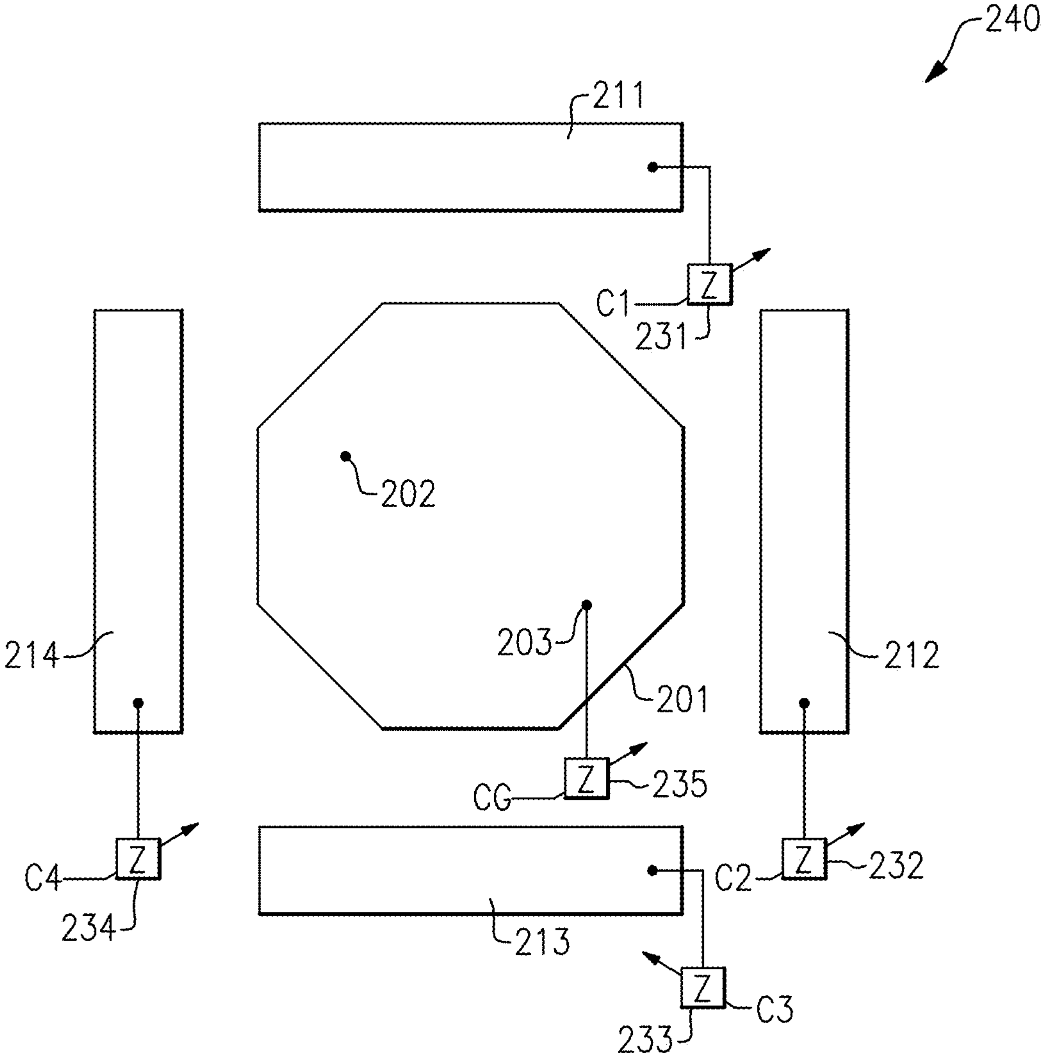
FIG. 6A is a plan view of another embodiment of an antenna system with tuning.

FIG. 6A is a plan view of another embodiment of an antenna system 240 with tuning.

The antenna system 240 includes a patch antenna element 201, a first tuning conductor 211, a second tuning conductor 212, a third tuning conductor 213, a fourth tuning conductor 214, a first tunable frequency response circuit 231, a second tunable frequency response circuit 232, a third tunable frequency response circuit 233, a fourth tunable frequency response circuit 234, and a ground feed tunable frequency response circuit 235.

Although FIG. 6A illustrates an implementation of an antenna system with one patch antenna element, four tuning conductors, and five tunable frequency response circuits, other configurations are possible. For example, an antenna system can include other numbers and/or types of antenna elements, tuning conductors, and/or tunable frequency response circuits. Moreover, the teachings herein are applicable to antenna systems including additional antennas, such as an array of patch antennas, as well as to antenna systems using other types of antenna elements. Accordingly, other implementations are possible.

The patch antenna element 201 can be used for transmitting and/or receiving signals, depending on implementation. Accordingly, the patch antenna element 201 can serve as a transmit antenna, a receive antenna, or a transmit/receive antenna. In one example, the signal feed 202 receives a transmit signal, such as a power amplifier output signal. In another example, the signal feed 202 is used to provide a receive signal to a low noise amplifier (LNA) or other receiver circuitry.

Although the illustrated patch antenna element 201 is substantially octagonal in shape, a patch antenna element can be shaped in a wide variety of ways including, but not limited to, substantially shaped as a triangle, square, pentagon, and/or hexagon. Furthermore, although the illustrated tuning conductors 211-214 are substantially rectangular in shape, tuning conductors can be shaped in a wide variety of ways.

The patch antenna element 201 and the tuning conductors 211-214 can be implemented in a planar configuration. For example, the antenna system 240 can be implemented on a surface of a substrate, such as a laminate. Thus, the patch antenna element 201 and the tuning conductors 211-214 can be implemented on by patterning a conductive layer of a laminate.

In the illustrated embodiment, the tuning conductors 211-214 are spaced apart from the patch antenna element 201, and surround a boundary or perimeter of the patch antenna element 201, but are spaced apart therefrom. For example, the first tuning conductor 211 is positioned adjacent a top side of the patch antenna element 201, the second tuning conductor 212 is positioned adjacent a right side of the patch antenna element 201, the third tuning conductor 213 is positioned adjacent a bottom side of the patch antenna element 201, and the fourth tuning conductor 214 is positioned adjacent a left side of the patch antenna element 201.

Although an example including four rectangular tuning conductors is illustrated, the teachings herein are applicable to implementations including more or fewer tuning conductors and/or tuning conductors with different shapes, sizes, and/or orientations. Accordingly, other implementations are possible.

In the illustrated embodiment, the first tunable frequency response circuit 231 is electrically connected to the first tuning conductor 211 and is controlled by a first control signal C1. Additionally, the second tunable frequency response circuit 232 is electrically connected to the second tuning conductor 212 and is controlled by a second control signal C2. Furthermore, the third tunable frequency response circuit 233 is electrically connected to the third tuning conductor 213 and is controlled by a third control signal C3. Additionally, the fourth tunable frequency response circuit 234 is electrically connected to the fourth tuning conductor 214 and is controlled by a fourth control signal C4.

The control signals C1-C4 can be generated in a wide variety of ways, and can correspond to digital signals, analog signals, or a combination thereof. In one example, the control signals C1-C4 are generated by data received over a bus from a transceiver or other suitable circuitry. In certain implementations, data stored in a programmable memory, such as a non-volatile memory, is used to set the signal level of the control signals C1-C4.

The patch antenna element 201 includes a signal feed 202 for handling an RF signal and a ground feed 203 for connecting to ground. In the illustrated embodiment, the antenna system 240 includes the ground feed tunable frequency response circuit 235 for providing an additional variable parameter for controlling the antenna characteristics of the antenna system 240, for instance, a second resonant frequency of the patch antenna element 201. Thus, tunable frequency response circuit can be included in addition to or alternatively to any tunable frequency response circuits included for any tuning conductors.

As shown in FIG. 6A, the control signal CG controls the ground feed tunable frequency response circuit 235. The control signal CG can be generated in any suitable way, including, but not limited to, based on data received over a bus.

Figure 6B:
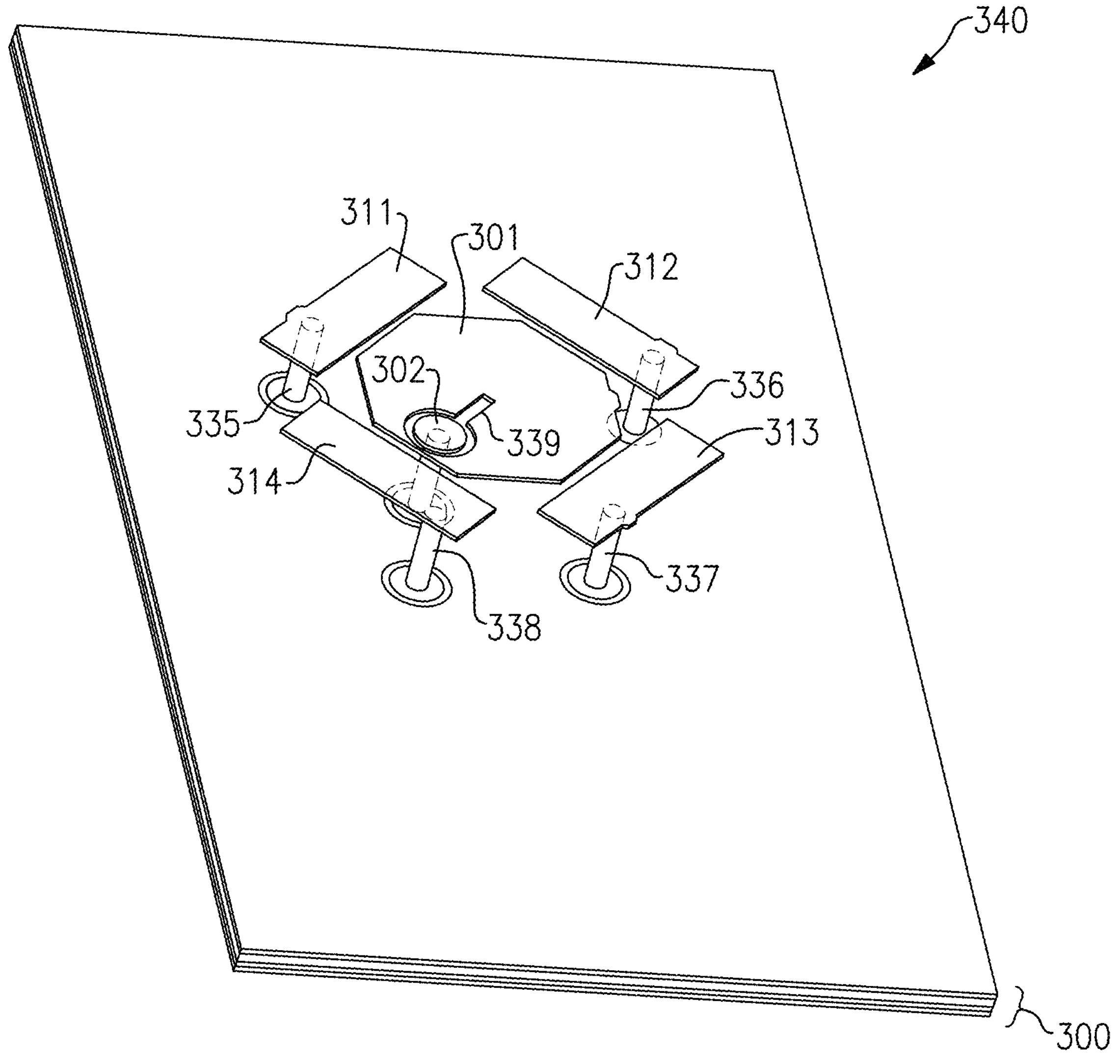
FIG. 6B is a perspective view of one embodiment of an RF module.

FIG. 6B is a perspective view of one embodiment of an RF module 340 with tuning. The RF module 340 includes a module substrate 300, a patch antenna element 301, a first tuning conductor 311, a second tuning conductor 312, a third tuning conductor 313, a fourth tuning conductor 314. With respect to FIG. 6B, certain layers have been depicted transparently so that certain components, such as vias, are visible.

The RF module 340 further includes first to fourth vias 335-338 for connecting the first to fourth tuning conductors 311-314, respectively, to first to fourth tunable frequency response circuits (not shown in FIG. 6B). The tunable frequency response circuits have been omitted from FIG. 6B for clarity of the figures. However, the tunable frequency response circuits can be included in a wide variety of locations, for instance, on a semiconductor die internal to or on a backside of the module substrate 300.

The patch antenna element 301 includes a signal feed 302. In certain implementations, the patch antenna element 301 further includes a ground feed (not illustrated in FIG. 6B). For example, including a ground feed aids in exciting a secondary resonance. In other implementations, a ground feed is omitted.

In the illustrated embodiment, the signal feed 302 is implemented as a center conductor that is capacitively coupled to the patch antenna element 301 to thereby feed the patch antenna element 301. Additionally, a slot 339 has been included in the patch antenna element 301 adjacent to the signal feed 302. Including the slot aids in controlling the input impedance into the patch antenna element 301 from the signal feed 302.

Although FIG. 6B illustrates one implementation of an RF module with tuning, the teachings herein are applicable to RF modules implemented in a wide variety of ways. Accordingly, other implementations are possible.

Figure 7A:
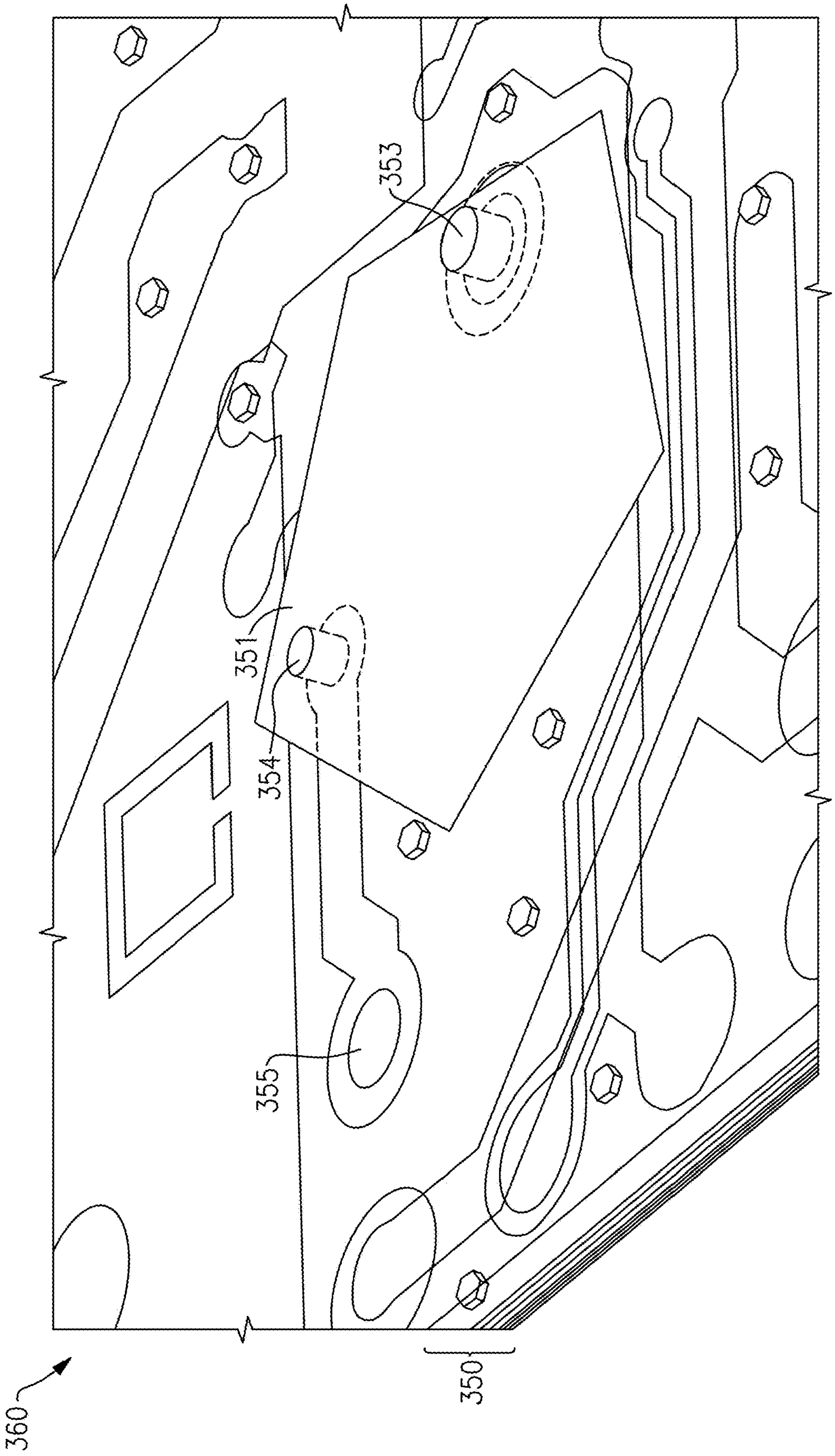
FIG. 7A is a perspective view of another embodiment of an antenna system with tuning.

FIG. 7A is a perspective view of another embodiment of an antenna system 360 with tuning. The antenna system 360 includes a patch antenna element 351 formed on a laminate 350. The patch antenna element 351 is pentagon-shaped, in this embodiment. Additionally, the patch antenna element 351 includes a signal feed 353 and a ground feed 354. The ground feed 354 connects to a tunable frequency response circuit (not shown in FIG. 7A) by way of a via 355 through the laminate 350.

Figure 7B:
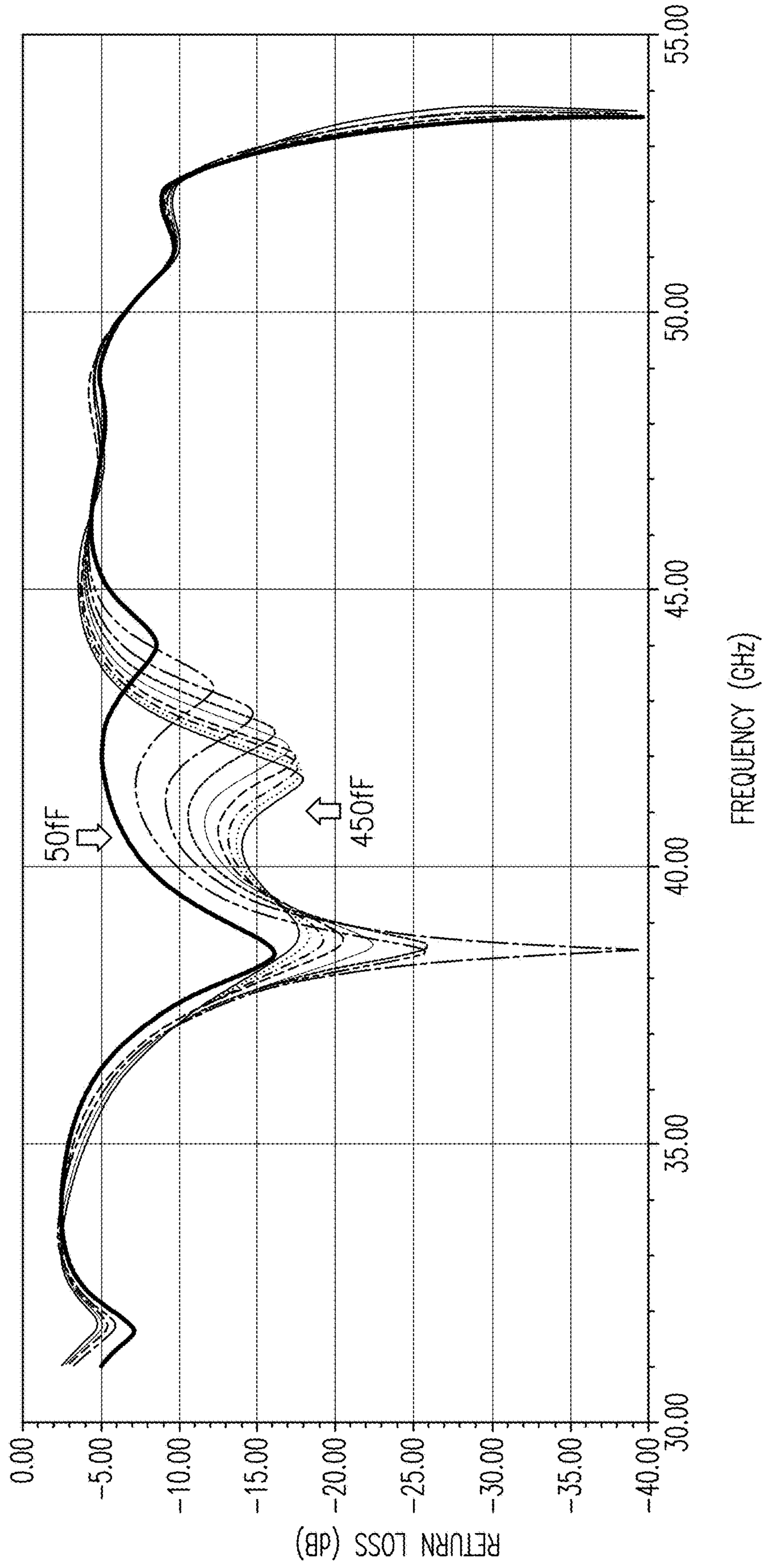
FIG. 7B is one example of a graph of return loss versus capacitance for an antenna system.

FIG. 7B is one example of a graph of return loss versus capacitance for the antenna system of 360 of FIG. 7A in which the tunable frequency response circuit includes a controllable capacitor connected between the via 355 and ground, and a series combination of an inductor and resistor in parallel with the controllable capacitor. The graph includes plots of return loss for various capacitance values of the controllable capacitor ranging between 50 fF and 450 fF.

Figure 7C:
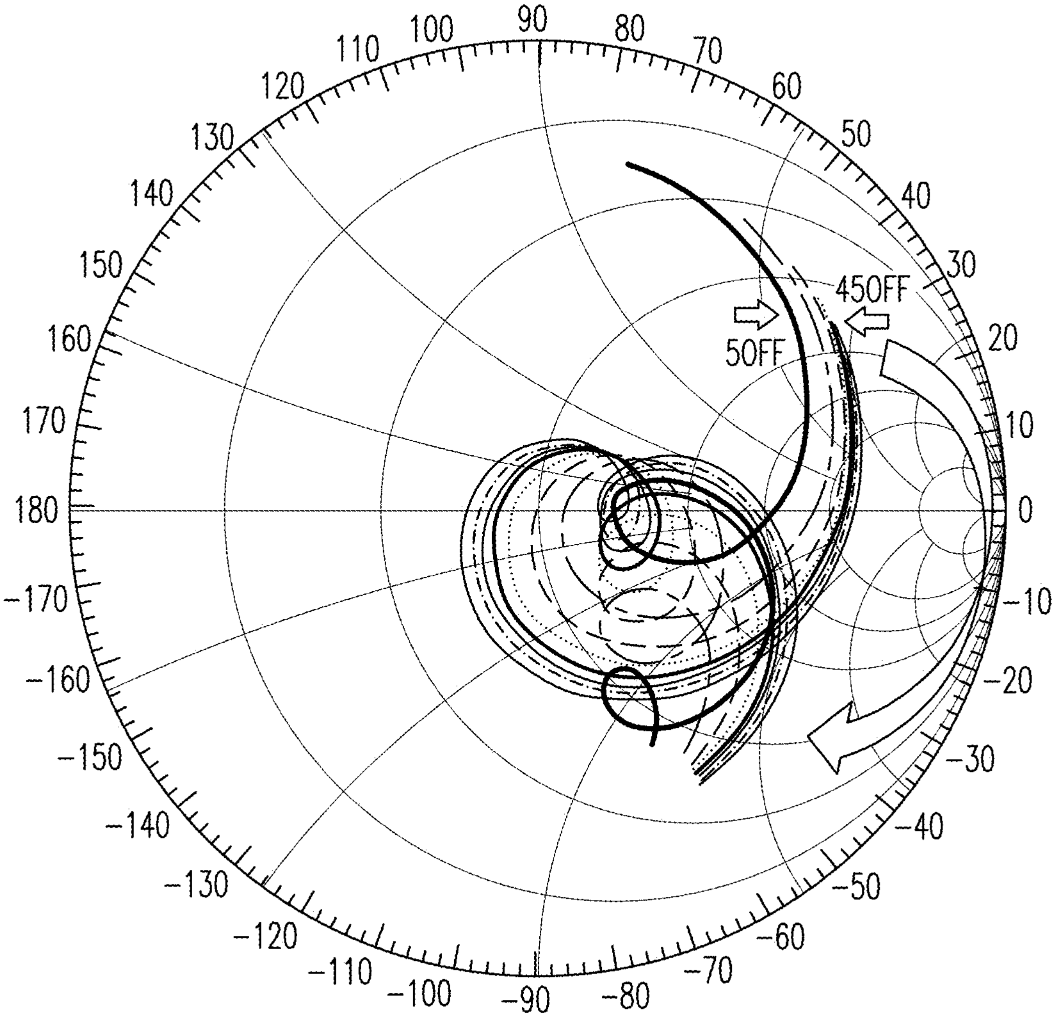
FIG. 7C is one example of contour plots versus capacitance of an antenna system.

FIG. 7C is one example of contour plots versus capacitance of the antenna system 360. The contour plots correspond to S-parameter contours plotted on a Smith chart for capacitance values swept between 50 fF and 450 fF, as described above.

The simulations of FIGS. 7A-7C were repeated for resistor values of 1.5 Ohms and 2.5 Ohms to confirm the change in resistance has little to no impact on shift in return loss.

Figure 8A:
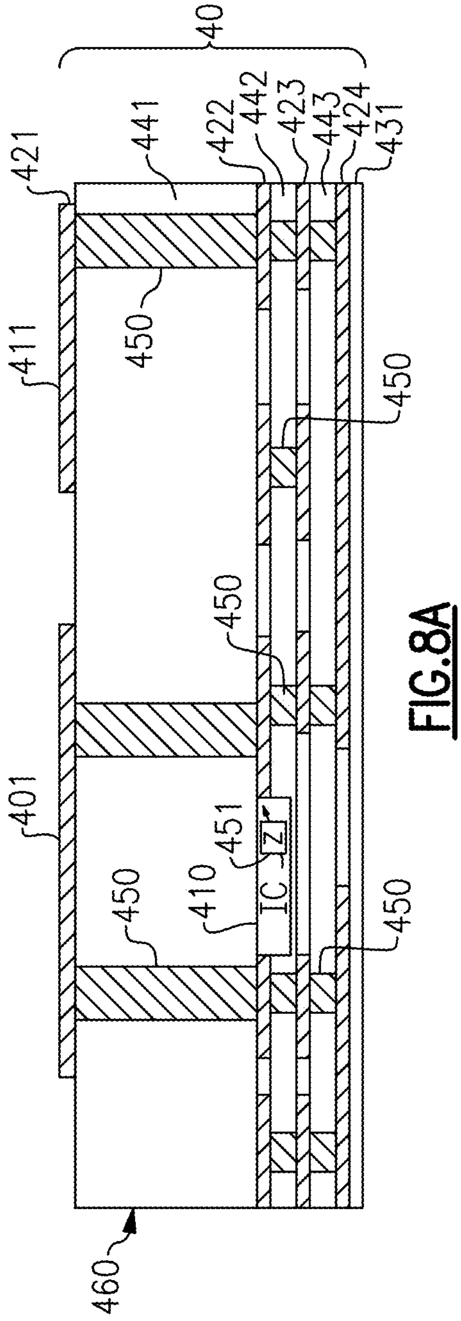
FIG. 8A is a cross-section of another embodiment of an RF module.

FIG. 8A is a cross-section of another embodiment of an RF module 460. The RF module 460 includes a laminated substrate or laminate 40 including a first conductive layer 421, a second conductive layer 422, a third conductive layer 423, a fourth conductive layer 424, a solder mask 431, a first dielectric layer 441, a second dielectric layer 442, a third dielectric layer 443, and vias 450. The RF module 460 further includes an IC 410 integrated in the laminate 40.

The first conductive layer 421 includes one or more antenna elements, such as an antenna element 401. In certain implementations, the antenna element 401 is a patch antenna element. The first conductive layer 421 further includes one or more tuning conductors, such as the tuning conductor 411. The IC 410 includes one or more tunable frequency response circuits 451. Additionally, vias 450 have been used to connect the one or more tuning conductors to corresponding tunable frequency response circuits 451 fabricated on the IC 410.

For clarity of the figures, an arbitrary patterning of the second conductive layer 422, the third conductive layer 433, and the third conductive layer 434 is shown. However, conductive layers can be patterned in a wide variety of ways. Furthermore, although one example of vias 450 is depicted, the vias 450 can be placed in a wide variety of ways.

The RF module 460 further includes a ground plane formed on one or more conductive layers. In certain implementations, the ground plane 460 is formed on the second conductive layer 422, the third conductive layer 423, and/or the fourth conductive layer 424.

In the illustrated embodiment, the IC 410 is embedded within to the laminate 40. Implementing the RF module 460 in this manner reduces conductive route lengths, thereby enhancing performance and alleviating routing congestion. However, other implementations are possible. For example, in another embodiment, an IC is included on a surface of the laminate 40.

In certain implementations, the IC 410 further includes a front-end system (for instance, one or more signal conditioning circuits), a transceiver, and/or other circuitry of a communications device. Although an implementation with one semiconductor chip is shown, the teachings herein are applicable to modules with additional chips.

In certain implementations, the IC 410 includes an interface, such as a Mobile Industry Processor Interface (MIPI) Radio Frequency Front End (RFFE) bus, an inter-integrated circuit ($I^2C$) bus, and/or a general-purpose input/output (GPIO) bus that receives data for controlling the tunable frequency response circuit(s) 451.

The laminate 40 can be implemented with layers of various thicknesses. In one specific example, the solder mask 431 is 20 μm thick, the conductive layers 421-424 are each 15 μm thick, the first dielectric layer 441 is 300 μm thick, and the second and third dielectric layers 442-443 are each 15 μm thick. Although one specific example of layer thicknesses has been provided, a laminate can be implemented in a wide variety of ways. For example, the number of, composition of, and/or thicknesses of laminate layers can vary widely based on implementation and/or application.

Figure 8B:
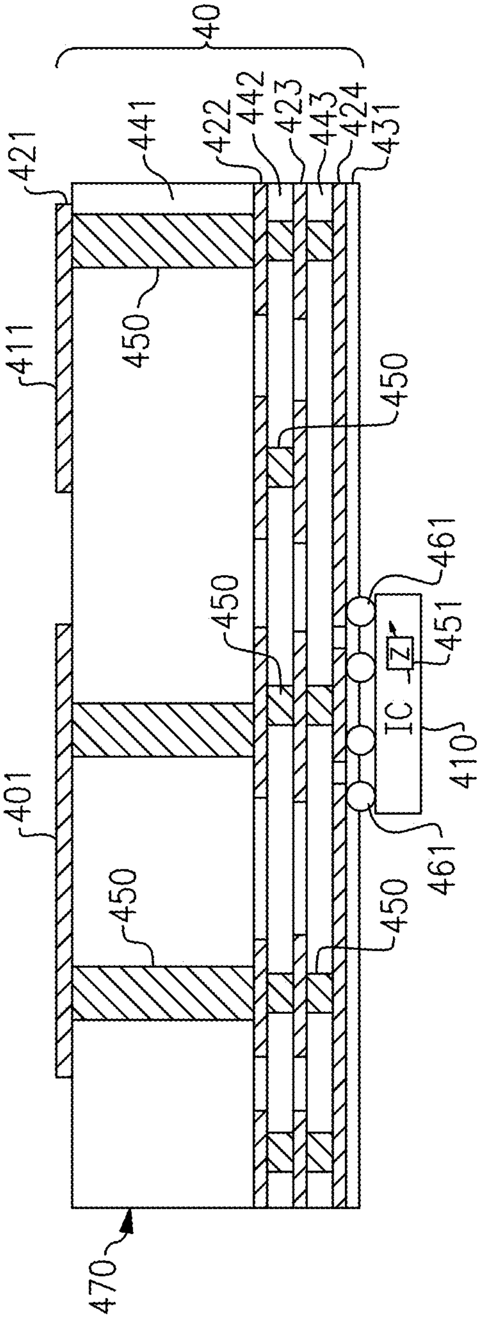
FIG. 8B is a cross-section of another embodiment of an RF module.

FIG. 8B is a cross-section of another embodiment of an RF module 470. The RF module 470 of FIG. 8B is similar to the RF module 460 of FIG. 8A, except that the RF module 470 of FIG. 8B illustrates a different location of the IC 410. In particular, the IC 410 is attached by solder balls 461 to a side of the laminate 410 opposite the tuning conductors and antenna elements, in this embodiment.

Figure 8C:
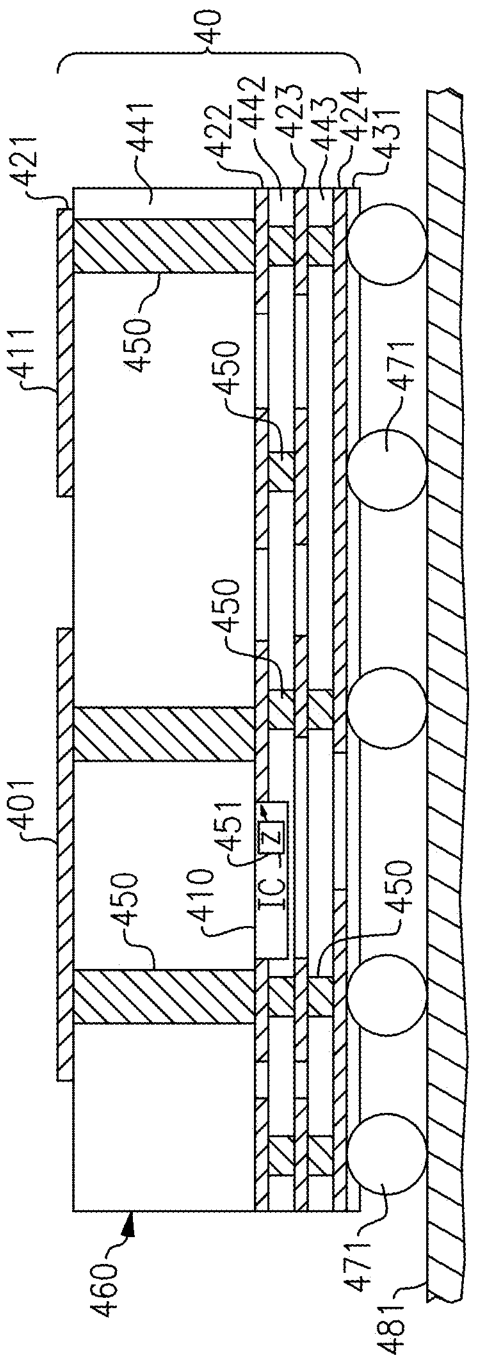
FIG. 8C is a cross-section of the RF module of FIG. 8A attached to a printed circuit board according to one embodiment.

FIG. 8C is a cross-section of the RF module 460 of FIG. 8A attached to a printed circuit board (PCB) 481 according to one embodiment. In the illustrated embodiment, the RF module 460 is attached by solder balls 471 to the PCB 481. For example, attachment can be provided by way of a ball grid array (BGA). Although one example of attaching the RF module 460 to a PCB is shown, the RF module 460 can be attached to a multitude of structures in a wide variety of ways.

Figure 8D:
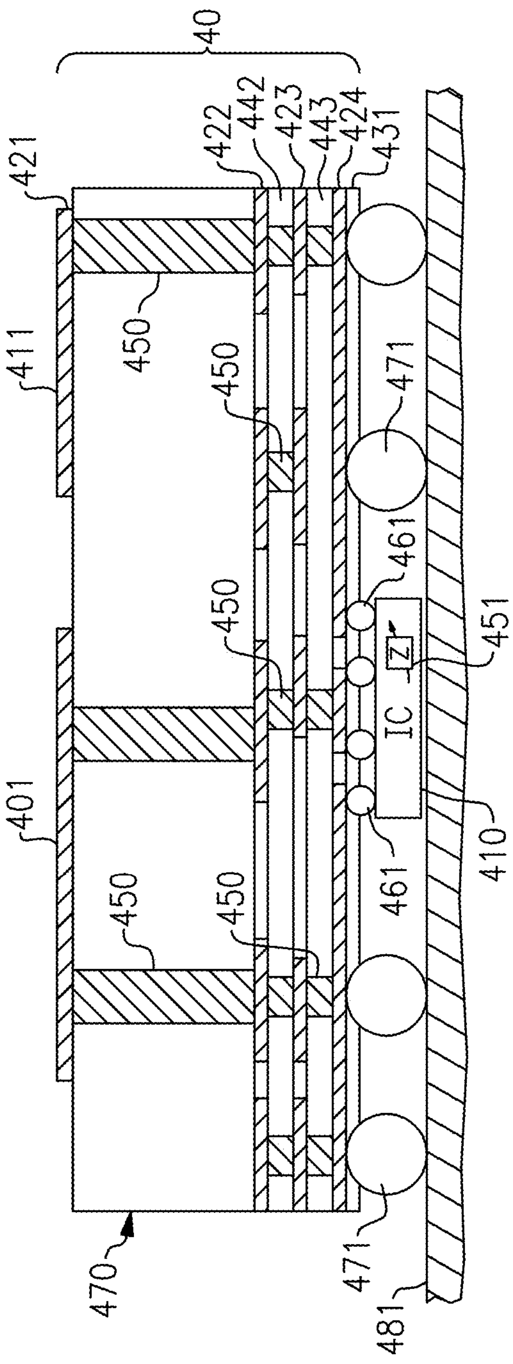
FIG. 8D is a cross-section of the RF module of FIG. 8B attached to a printed circuit board according to one embodiment.

FIG. 8D is a cross-section of the RF module 470 of FIG. 8B attached to a PCB 481 according to one embodiment. In the illustrated embodiment, the RF module 470 is attached by solder balls 471 to the PCB 481. Although one example of attaching the RF module 470 is shown, the RF module 470 can be attached in other ways.

Figure 8E:
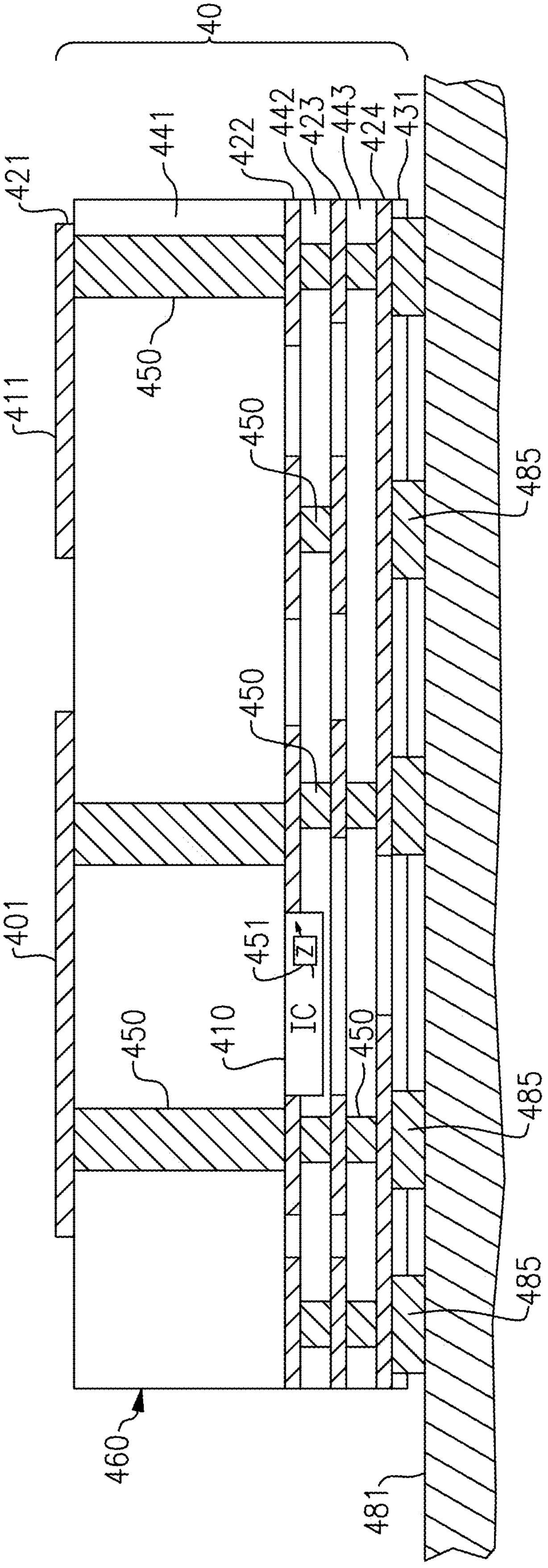
FIG. 8E is a cross-section of the RF module of FIG. 8A attached to a printed circuit board according to another embodiment.

FIG. 8E is a cross-section of the RF module 460 of FIG. 8A attached to a PCB 481 according to another embodiment. In the illustrated embodiment, the RF module 460 is attached by pads 485 to the PCB 481. For example, attachment can be provided by way of a land grid array (LGA). Although another example of attaching the RF module 460 to a PCB is shown, the RF module 460 any suitable attachment scheme can be used to connect the RF module 460 to a PCB or other structure.

Figure 8F:
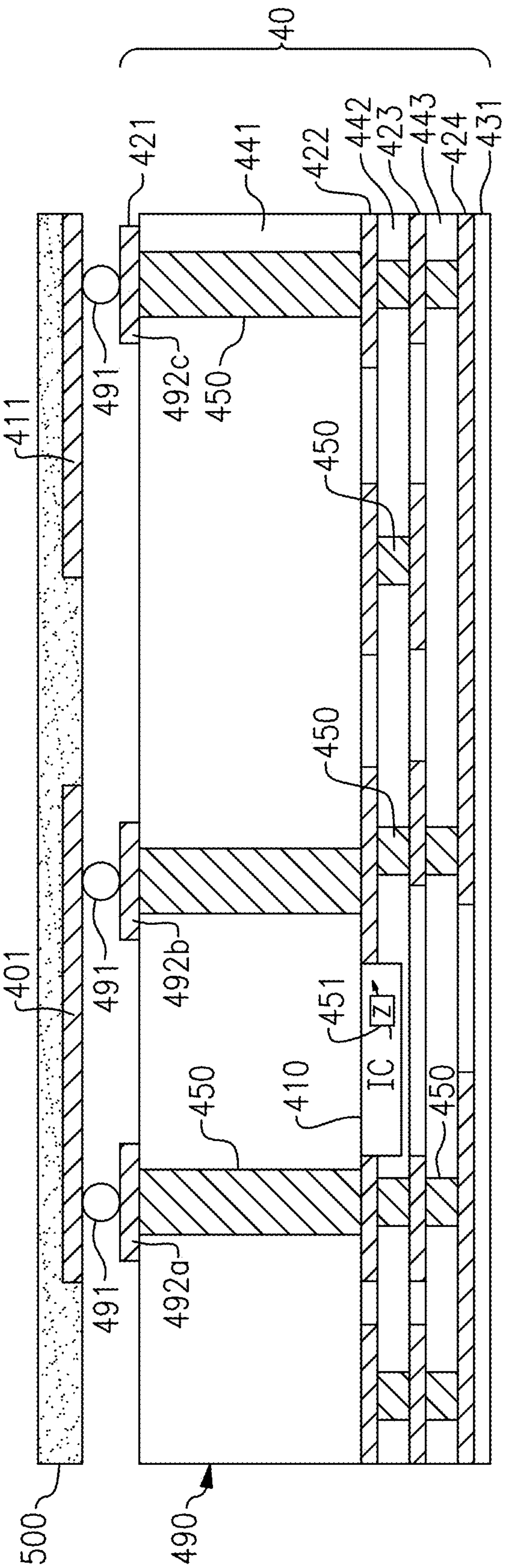
FIG. 8F is a cross-section of an RF module and a glass substrate according to one embodiment.

FIG. 8F is a cross-section of an RF module 490 and a glass substrate 500 according to one embodiment. The RF module 490 of FIG. 8F is similar to the RF module 460 of FIG. 8A, except that the RF module 490 omits the antenna element 401 and tuning conductor 411. Rather, the glass substrate 500 includes the antenna element 401 and the tuning conductor 411 thereon.

As shown in FIG. 8F, the first conductive layer 421 of the RF module 490 has been patterned to include pads for connecting to the glass substrate 500 via solder balls 491. For example, the pads can include a first pad **492*a* for connecting to a signal feed of the antenna element 401, a second pad 492***b* for connecting to a ground feed of the antenna element 401, and a third pad 492*c* for connecting to the tuning conductor 411.

The glass substrate 500 can include one or more metal layers included thereon. Thus, the glass substrate 500 can include multiple layers, in certain implementations. Although illustrated as of equal width as the laminate 40, the glass substrate 500 can have narrower width, greater width, or equal width as the laminate 40. Furthermore, the glass substrate 500 can have any suitable thickness, including a thickness less than the laminate 40, greater than the laminate 40, or equal to the laminate 40.

Although not shown in FIG. 8F, the RF module 490 is also connected to a PCB in certain implementations. For instance, in one example, a PCB is included on a side of laminate 40 opposite the glass substrate 500, and the RF module 490 is coupled to the PCB by way of a BGA, LGA, or other suitable interface.

Figure 8G:
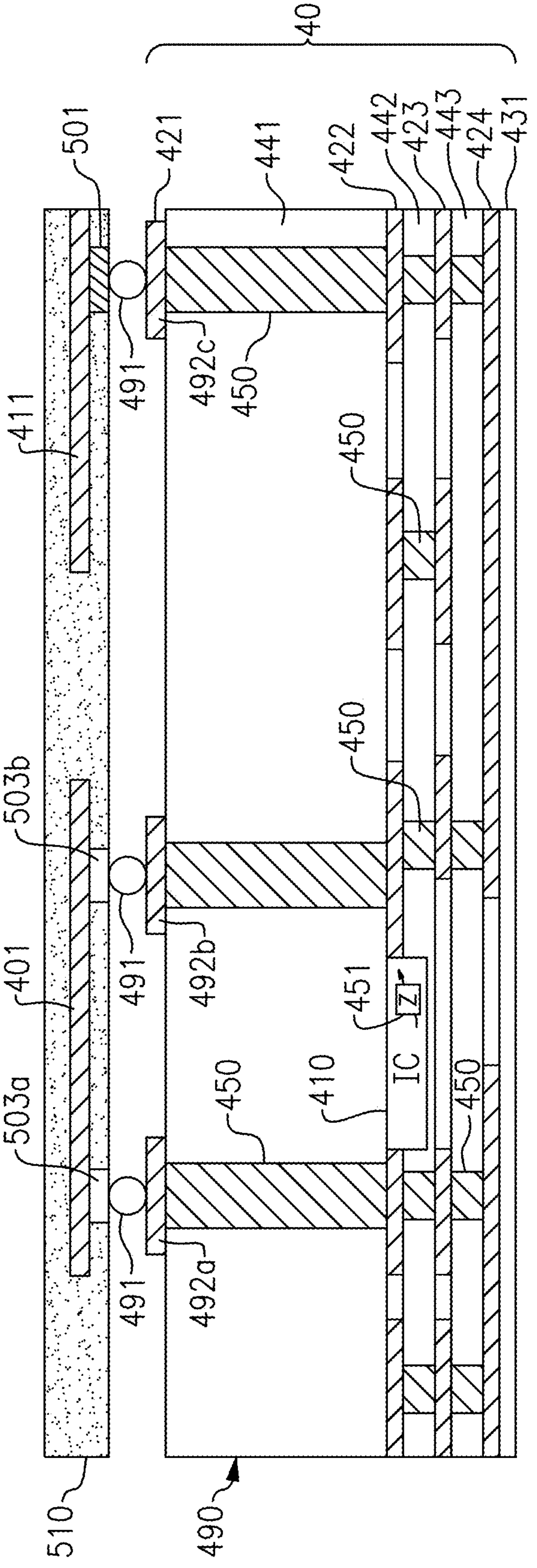
FIG. 8G is a cross-section of an RF module and a glass substrate according to another embodiment.

FIG. 8G is a cross-section of an RF module 490 and a glass substrate 510 according to another embodiment. In the illustrated embodiment, the glass substrate 510 includes a conductive layer internal to the glass substrate 510 and including the antenna element 401 and the tuning conductor 411. Additionally, a via 501 is included in the glass substrate 510 for electrically connecting the third pad 492*c* of the RF module 490 to the tuning conductor 411 via metallization.

As shown in FIG. 8G, corresponding metal filled vias in the glass substrate 510 are omitted for connecting the first pad 492*a* and the second pad 492*b* to the antenna element 401 via metallization. Rather, the vias 503*a*, 503*b* correspond to cavities used to guide electromagnetic fields to and from the antenna element 401, thereby achieving coupling.

The teachings herein are applicable to antenna elements in which a signal feed and/or a ground feed is provided by an electrical connection by way of metallization as well as to antenna elements in which a signal feed and/or a ground feed is provided by electromagnetic coupling.

Figure 8H:
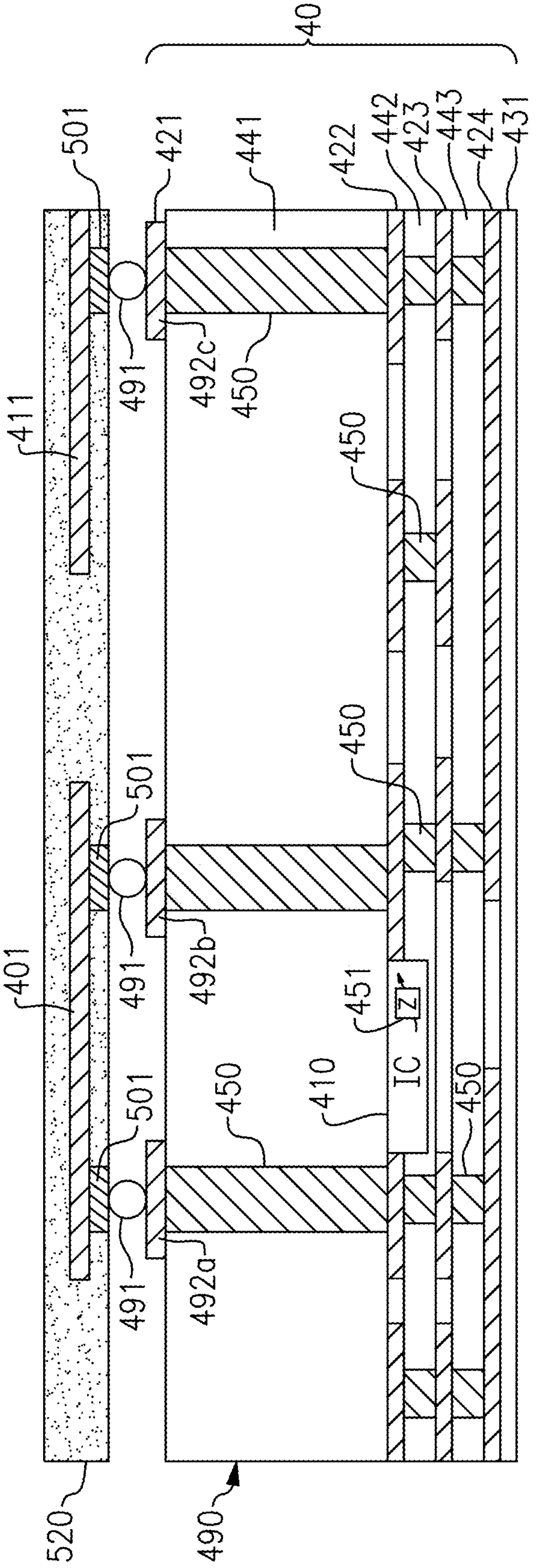
FIG. 8H is a cross-section of an RF module and a glass substrate according to another embodiment.

FIG. 8H is a cross-section of an RF module 490 and a glass substrate 520 according to another embodiment. The glass substrate 520 of FIG. 8H is similar to the glass substrate 510 of FIG. 8G, except that the glass substrate 520 of FIG. 8H includes vias 501 for connecting not only the third pad 492*c* to the tuning conductor 411, but also for connecting the first pad 492*a* to the antenna element 401 and the second pad 492*b* to the antenna element 401.

Figure 8I:
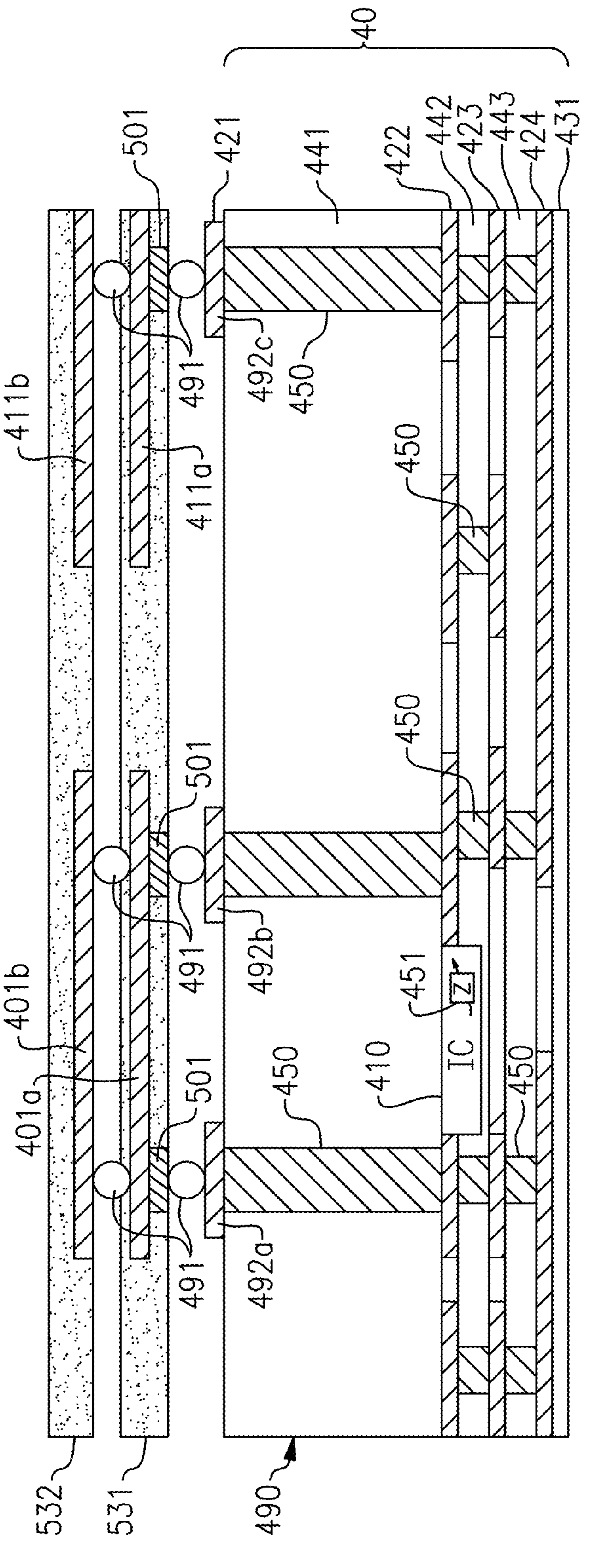
FIG. 8I is a cross-section of an RF module and stacked glass substrates according to one embodiment.

FIG. 8I is a cross-section of an RF module 490 and stacked glass substrates according to one embodiment. As shown in FIG. 8I, a first glass substrate 531 is coupled to the pads 492*a*-492*c* of the RF module 490 by way of solder balls 491, in this example. The first glass substrate 531 includes a first antenna element 401*a*, a first tuning conductor 411*a*, and vias 501.

Additionally, the second glass substrate 532 is stacked over the first glass substrate 531, such that the first glass substrate 531 is positioned between the RF module 490 and the second glass substrate 532. The second glass substrate 532 includes a second antenna element 401*b* and a second tuning conductor 411*b*, which are connected by solder balls 491 to the first antenna element 401*a* and the first tuning conductor 411*a*, respectively.

In certain embodiments herein, two or more glass substrates are stacked. Furthermore, the glass substrates can include antenna elements to provide an antenna array and/or three-dimensional antenna structures. Moreover, the glass substrates can include tuning conductors to provide a tuning conductor array and/or three-dimensional tuning structures.

Figure 9A:
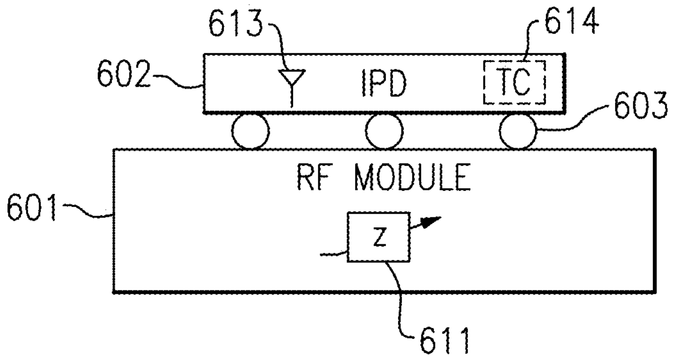
FIG. 9A is a cross-section of an RF module and an IPD die according to one embodiment.

FIG. 9A is a cross-section of an RF module 601 and an IPD die 602 according to one embodiment. The RF module 601 includes at least one tunable frequency response circuit 611 implemented in accordance with the teachings herein. As shown in FIG. 9A, an IPD die 602 is attached to the RF module 601 via balls 603 or other suitable attachment mechanism. The IPD die 602 includes at least one antenna element 613 and at least one tuning conductor 614. In certain implementations, the IPD die 602 includes a glass substrate on which the antenna element 613 and the tuning conductor 614 are fabricated.

Figure 9B:
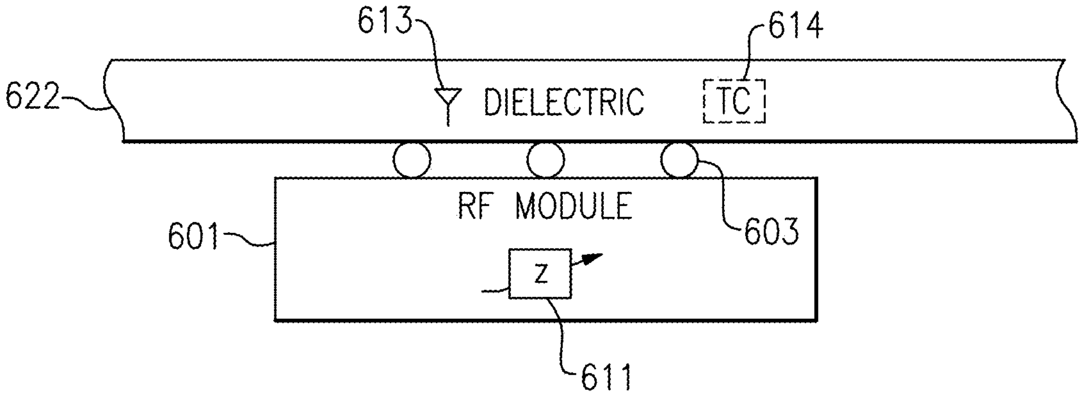
FIG. 9B is a cross-section of an RF module and a dielectric panel according to one embodiment.

FIG. 9B is a cross-section of an RF module 601 and a dielectric panel 622 (for instance, glass and/or ceramic) according to one embodiment. The RF module 601 includes at least one tunable frequency response circuit 611 implemented in accordance with the teachings herein. As shown in FIG. 9B, the dielectric panel 622 is attached to the RF module 601 via balls 603 or other suitable attachment mechanism. The dielectric panel 622 includes at least one antenna element 613 and at least one tuning conductor 614. In one embodiment, the dielectric panel 622 corresponds to a glass display, for instance a touch screen display of a mobile device, tablet, or other UE.

Figure 10A:
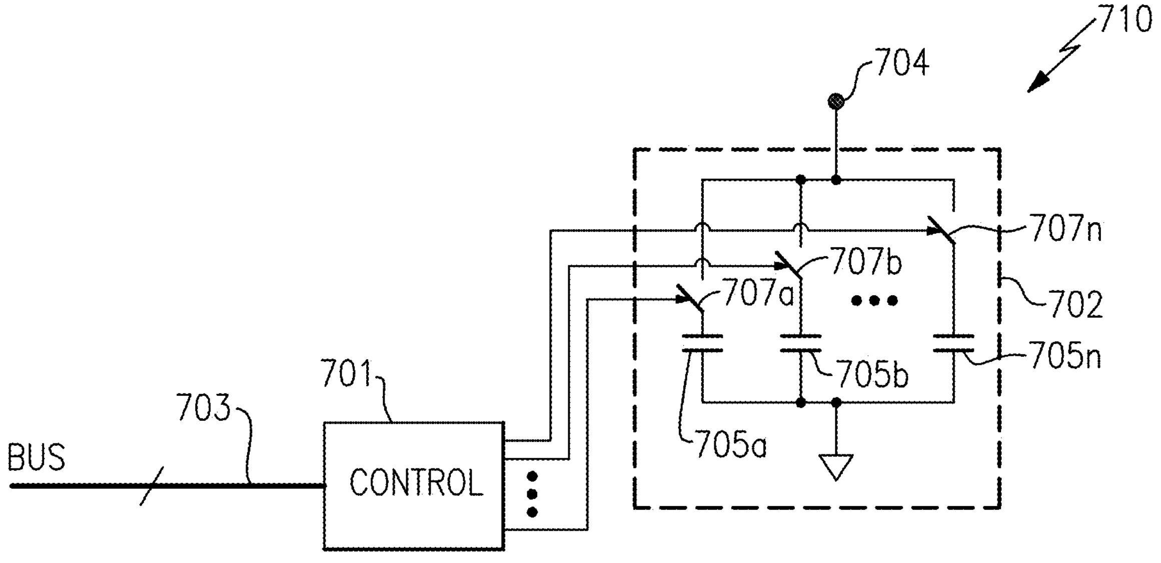
FIG. 10A is a schematic diagram of one embodiment of a tunable frequency response circuit for an antenna system.

FIG. 10A is a schematic diagram of one embodiment of a tunable frequency response circuit 710 for an antenna system. The tunable frequency response circuit 710 includes a control circuit 701 and a controllable impedance array 702. The tunable frequency response circuit 710 further includes a terminal 704 for connected to a tuning conductor or a ground feed of an antenna system in accordance with the teachings herein.

In the illustrated embodiment, the controllable impedance array 702 includes capacitors 705*a*, 705*b*, . . . 705*n* and switches 707*a*, 707*b*, . . . 707*n*. As shown in FIG. 10A, each of the capacitors 705*a*, 705*b*, . . . 705*n* is electrically connected in series with a corresponding one of the switches 707*a*, 707*b*, . . . 707*n* between the terminal 704 and ground. Any number of switch selected capacitors can be included as indicated by the ellipses. Although one embodiment of a controllable impedance array is shown, other implementations are possible.

As shown in FIG. 10A, the control circuit 701 receives data over a bus 703. For example, the control circuit 701 can be coupled to a transceiver or other suitable circuit over the bus 703. Additionally, the control circuit 701 processes the data to control selection of the switches 707*a*, 707*b*, . . . 707*n*, thereby controlling the impedance of the controllable impedance array 702. In certain implementations, the switches 707*a*, 707*b*, 707*n* correspond to field-effect transistor (FET) switches.

Figure 10B:
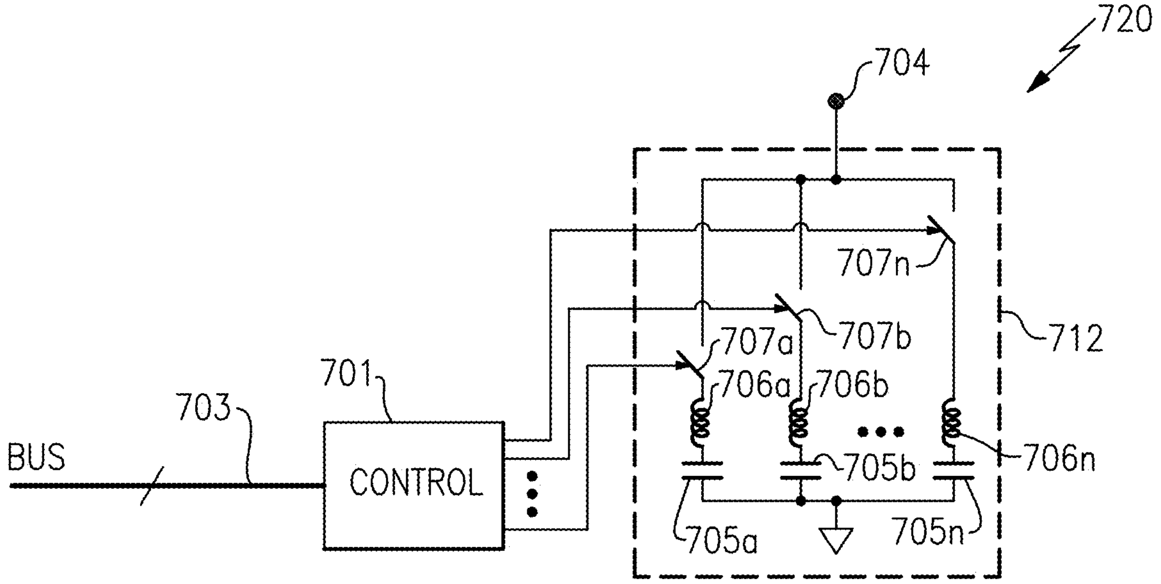
FIG. 10B is a schematic diagram of another embodiment of a tunable frequency response circuit for an antenna system.

FIG. 10B is a schematic diagram of another embodiment of a tunable frequency response circuit 720 for an antenna system. The tunable frequency response circuit 720 includes a control circuit 701 and a controllable impedance array 712. The tunable frequency response circuit 710 further includes a terminal 704 for connected to a tuning conductor or a ground feed of an antenna system.

The tunable frequency response circuit 720 of FIG. 10B is similar to the tunable frequency response circuit 710 of FIG. 7A, except that the controllable impedance array 712 of FIG. 10B further include the inductors 706*a*, 706*b*, . . . 706*n*. In this embodiment, the inductors 706*a*, 706*b*, . . . 706*n* are connected in series with corresponding ones of the capacitors 705*a*, 705*b*, . . . 705*n* and corresponding ones of the switches 707*a*, 707*b*, . . . 707*n*.

Figure 11:
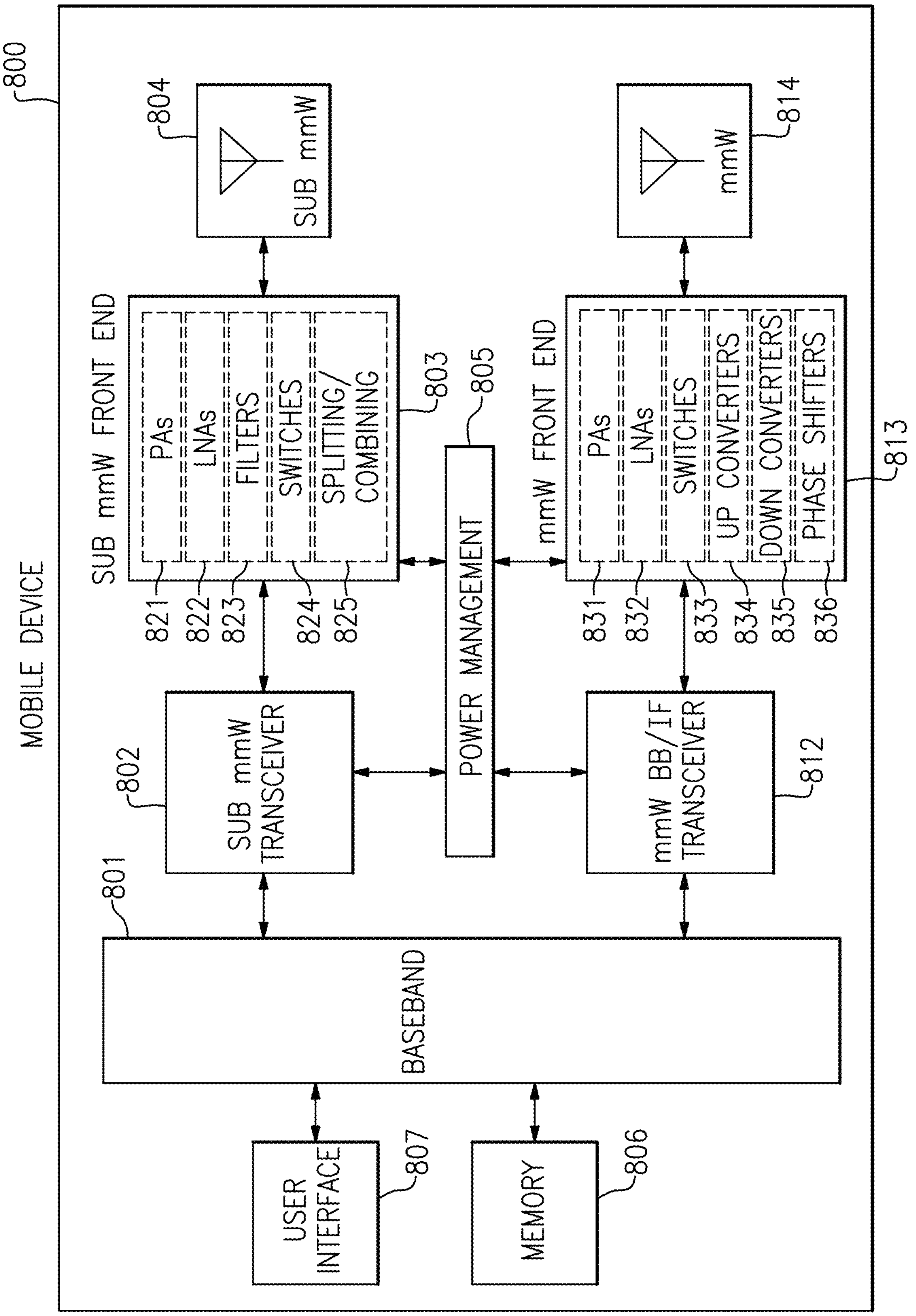
FIG. 11 is a schematic diagram of one embodiment of a mobile device.

FIG. 11 is a schematic diagram of one embodiment of a mobile device 800. The mobile device 800 includes a baseband system 801, a sub millimeter wave (mmW) transceiver 802, a sub mmW front end system 803, sub mmW antennas 804, a power management system 805, a memory 806, a user interface 807, a mmW baseband (BB)/intermediate frequency (IF) transceiver 812, a mmW front end system 813, and mmW antennas 814.

The mobile device 800 can be used communicate using a wide variety of communications technologies, including, but not limited to, 2G, 3G, 4G (including LTE, LTE-Advanced, and LTE-Advanced Pro), 5G NR, WLAN (for instance, WiFi), WPAN (for instance, Bluetooth and ZigBee), WMAN (for instance, WiMax), and/or GPS technologies.

In the illustrated embodiment, the sub mmW transceiver 802, sub mmW front end system 803, and sub mmW antennas 804 serve to transmit and receive centimeter waves and other radio frequency signals below millimeter wave frequencies. Additionally, the mmW BB/IF transceiver 812, mmW front end system 813, and mmW antennas 814 serve to transmit and receive millimeter waves. Although one specific example is shown, other implementations are possible, including, but not limited to, mobile devices operating using circuitry operating over different frequency ranges and wavelengths.

The sub mmW transceiver 802 generates RF signals for transmission and processes incoming RF signals received from the sub mmW antennas 804. It will be understood that various functionalities associated with the transmission and receiving of RF signals can be achieved by one or more components that are collectively represented in FIG. 11 as the sub mmW transceiver 802. In one example, separate components (for instance, separate circuits or dies) can be provided for handling certain types of RF signals.

The sub mmW front end system 803 aids in conditioning signals transmitted to and/or received from the antennas 804. In the illustrated embodiment, the front end system 803 includes power amplifiers (PAs) 821, low noise amplifiers (LNAs) 822, filters 823, switches 824, and signal splitting/combining circuitry 825. However, other implementations are possible.

For example, the sub mmW front end system 803 can provide a number of functionalizes, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

In certain implementations, the mobile device 800 supports carrier aggregation, thereby providing flexibility to increase peak data rates. Carrier aggregation can be used for both Frequency Division Duplexing (FDD) and Time Division Duplexing (TDD) and may be used to aggregate a plurality of carriers or channels. Carrier aggregation includes contiguous aggregation, in which contiguous carriers within the same operating frequency band are aggregated. Carrier aggregation can also be non-contiguous and can include carriers separated in frequency within a common band or in different bands.

The sub mmW antennas 804 can include antennas used for a wide variety of types of communications. For example, the sub mmW antennas 804 can include antennas for transmitting and/or receiving signals associated with a wide variety of frequencies and communications standards.

The mmW BB/IF transceiver 812 generates millimeter wave signals for transmission and processes incoming millimeter wave signals received from the mmW antennas 814. It will be understood that various functionalities associated with the transmission and receiving of RF signals can be achieved by one or more components that are collectively represented in FIG. 11 as the mmW transceiver 812. The mmW BB/IF transceiver 812 can operate at baseband or intermediate frequency, based on implementation.

The mmW front end system 813 aids is conditioning signals transmitted to and/or received from the mmW antennas 814. In the illustrated embodiment, the front end system 803 includes power amplifiers 831, low noise amplifiers 832, switches 833, up converters 834, down converters 835, and phase shifters 836. However, other implementations are possible. In one example, the mobile device 800 operates with a BB mmW transceiver, and up converters and downconverters are omitted from the mmW front end system. In another example, the mmW front end system further includes filters for filtering millimeter wave signals.

The mmW antennas 814 can include antennas used for a wide variety of types of communications. The mmW antennas 814 can include antenna elements implemented in a wide variety of ways, and in certain configurations the antenna elements are arranged to form one or more antenna arrays. Examples of antenna elements for millimeter wave antenna arrays include, but are not limited to, patch antennas, dipole antenna elements, ceramic resonators, stamped metal antennas, and/or laser direct structuring antennas.

In certain implementations, the mobile device 800 supports MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

In certain implementations, the mobile device 800 operates with beamforming. For example, the mmW front end system 803 includes amplifiers having controllable gain and phase shifters having controllable phase to provide beam formation and directivity for transmission and/or reception of signals using the mmW antennas 814. For example, in the context of signal transmission, the amplitude and phases of the transmit signals provided to an antenna array used for transmission are controlled such that radiated signals combine using constructive and destructive interference to generate an aggregate transmit signal exhibiting beam-like qualities with more signal strength propagating in a given direction. In the context of signal reception, the amplitude and phases are controlled such that more signal energy is received when the signal is arriving to the antenna array from a particular direction.

The baseband system 801 is coupled to the user interface 807 to facilitate processing of various user input and output (I/O), such as voice and data. The baseband system 801 provides the sub mmW and mmW transceivers with digital representations of transmit signals, which are processed by the transceivers to generate RF signals for transmission. The baseband system 801 also processes digital representations of received signals provided by the transceivers. As shown in FIG. 11, the baseband system 801 is coupled to the memory 806 of facilitate operation of the mobile device 800.

The memory 806 can be used for a wide variety of purposes, such as storing data and/or instructions to facilitate the operation of the mobile device 800 and/or to provide storage of user information.

The power management system 805 provides a number of power management functions of the mobile device 800. In certain implementations, the power management system 805 includes a PA supply control circuit that controls the supply voltages of the power amplifiers of the front end systems. For example, the power management system 805 can be configured to change the supply voltage(s) provided to one or more of the power amplifiers to improve efficiency, such as power added efficiency (PAE).

In certain implementations, the power management system 805 receives a battery voltage from a battery. The battery can be any suitable battery for use in the mobile device 800, including, for example, a lithium-ion battery.

CONCLUSION

Some of the embodiments described above have provided examples of tunable antenna systems in connection with cellular communication devices. However, the principles and advantages of the embodiments can be used for any other systems or apparatus that benefit from any of the circuits and systems described herein.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "may," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. An antenna system comprising:

a first patch antenna element;

a first tuning conductor electromagnetically coupled to the first patch antenna element and operable to load the first patch antenna element, the first patch antenna element and the first tuning conductor formed in a common conductive layer of a substrate; and a first tunable frequency response circuit electrically connected to the first tuning conductor, the first tunable frequency response circuit having an impedance that is controllable to tune the first patch antenna element, the first tunable frequency response circuit including at least one inductor and at least one capacitor.

2. The antenna system of claim 1 wherein the first tunable frequency response circuit includes a plurality of circuit branches electrically connected in parallel and each including a selection switch for activating the circuit branch.

3. The antenna system of claim 2 wherein each of the plurality of circuit branches includes a capacitor in series with the selection switch.

4. The antenna system of claim 2 wherein each of the plurality of circuit branches includes an inductor in series with the selection switch.

5. The antenna system of claim 2 wherein each of the plurality of circuit branches includes an inductor and a capacitor in series with the selection switch.

6. The antenna system of claim 1 further comprising a second tuning conductor electromagnetically coupled to the first patch antenna element, and a second tunable frequency response circuit electrically connected to the second tuning conductor.

7. The antenna system of claim 1 further comprising a second patch antenna element, the first tuning conductor electromagnetically coupled to the second patch antenna element and operable to load the second patch antenna element.

8. The antenna system of claim 1 further comprising a second patch antenna element, a second tuning conductor electromagnetically coupled to the second patch antenna element and operable to load the second patch antenna element, and a second tunable frequency response circuit electrically connected to the second tuning conductor.

9. The antenna system of claim 1 wherein the first patch antenna element includes a signal feed configured to handle a radio frequency signal and a ground feed, the antenna system further comprising a second tunable frequency response circuit electrically connected to the ground feed.

10. The antenna system of claim 1 wherein the substrate is a glass substrate, the first tunable frequency response circuit is integrated on a module substrate, and the glass substrate that is coupled to the module substrate.

11. The antenna system of claim 1 wherein the substrate is a module substrate and the first tunable frequency response circuit, the first patch antenna element, and the first tuning conductor are integrated on the module substrate.

12. A mobile device comprising:

a first patch antenna element including a signal feed configured to receive an amplified radio frequency signal;

a first tuning conductor electromagnetically coupled to the first patch antenna element and operable to load the first patch antenna element, the first patch antenna element and the first tuning conductor formed in a common conductive layer of a substrate; and a front end system including a power amplifier configured to amplify a radio frequency signal to generate the amplified radio frequency signal and a first tunable frequency response circuit electrically connected to the first tuning conductor, the first tunable frequency response circuit having an impedance that is controllable to tune the first patch antenna element, the first tunable frequency response circuit including at least one inductor and at least one capacitor.

13. The mobile device of claim 12 wherein the first tunable frequency response circuit includes a plurality of circuit branches electrically connected in parallel and each including a selection switch for activating the circuit branch.

14. The mobile device of claim 13 wherein each of the plurality of circuit branches includes an inductor and a capacitor in series with the selection switch.

15. The mobile device of claim 12 further comprising a second tuning conductor electromagnetically coupled to the first patch antenna element and operable to load the first patch antenna element, and a second tunable frequency response circuit electrically connected to the second tuning conductor.

16. The mobile device of claim 12 wherein the first tunable frequency response circuit is controllable by data received over a bus.

17. A method of tuning a frequency response of an antenna system, the method comprising:

amplifying a radio frequency signal using a power amplifier;

providing the amplified radio frequency signal to a signal feed of a first patch antenna element; and tuning the first antenna element using a first tuning conductor electromagnetically coupled to the first patch antenna element and operable to load the first patch antenna element, including controlling an impedance of a first tunable frequency response circuit that is electrically connected to the first tuning conductor, the first patch antenna element and the first tuning conductor formed in a common conductive layer of a substrate, and the first tunable frequency response circuit including at least one inductor and at least one capacitor.

18. The method of claim 17 wherein controlling the impedance of the first tunable frequency response circuit includes controlling a plurality of selection switches of a plurality of circuit branches.

19. The method of claim 17 further comprising tuning the first patch antenna element using a second tuning conductor electromagnetically coupled to the first patch antenna element and operable to load the first patch antenna element, including controlling an impedance of a second tunable frequency response circuit that is electrically connected to the second tuning conductor.

20. The method of claim 17 further comprising tuning a second patch antenna element using the first tuning conductor.

* * * * *